United States Patent
Poole et al.

(10) Patent No.: US 10,371,844 B2
(45) Date of Patent: Aug. 6, 2019

(54) PROCESSING SEISMIC DATA ACQUIRED USING MOVING NON-IMPULSIVE SOURCES

(71) Applicant: CGG SERVICES SAS, Massy (FR)

(72) Inventors: Gordon Poole, East Grinstead (GB); Can Peng, Fulshear, TX (US)

(73) Assignee: CGG SERVICES SAS, Massy (FR)

( * ) Notice: Subject to any disclaimer, the term of this patent is extended or adjusted under 35 U.S.C. 154(b) by 2 days.

(21) Appl. No.: 15/535,159

(22) PCT Filed: Dec. 18, 2015

(86) PCT No.: PCT/IB2015/002626
§ 371 (c)(1),
(2) Date: Jun. 12, 2017

(87) PCT Pub. No.: WO2016/110738
PCT Pub. Date: Jul. 14, 2016

(65) Prior Publication Data
US 2017/0371055 A1 Dec. 28, 2017

Related U.S. Application Data

(60) Provisional application No. 62/168,975, filed on Jun. 1, 2015, provisional application No. 62/116,577, filed (Continued)

(51) Int. Cl.
*G01V 1/37* (2006.01)
*G01V 1/36* (2006.01)

(52) U.S. Cl.
CPC .............. *G01V 1/375* (2013.01); *G01V 1/366* (2013.01); *G01V 1/368* (2013.01);
(Continued)

(58) Field of Classification Search
CPC . G01V 1/28; G01V 1/36; G01V 1/375; G01V 1/366; G01V 1/368; G01V 2210/614; G01V 2210/1214
See application file for complete search history.

(56) References Cited

U.S. PATENT DOCUMENTS 4,809,235 A 2/1989 Dragoset, Jr.
6,151,556 A 11/2000 Allen
(Continued)

FOREIGN PATENT DOCUMENTS

WO 2015011160 A1 1/2015

OTHER PUBLICATIONS

A. Ziolkowski et al., "The signature of an air gun array: Computation from near-field measurements including interactions", Geophysics, Oct. 1982, pp. 1413-1421, vol. 47, No. 10.
(Continued)

*Primary Examiner* — Ian J Lobo
(74) *Attorney, Agent, or Firm* — Patent Portfolio Builders PLLC

(57) ABSTRACT

Methods for processing seismic data acquired with non-impulsive moving sources are provided. Some methods remove cross-talk noise from the seismic data using emitted signal data and an underground formation's response estimate, which may be iteratively enhanced. Some methods perform resampling before a spatial or a spatio-temporal inversion. Some methods compensate for source's motion during the inversion, and/or are usable for multiple independently moving sources.

16 Claims, 25 Drawing Sheets

Related U.S. Application Data on Feb. 16, 2015, provisional application No. 62/110,849, filed on Feb. 2, 2015, provisional application No. 62/099,676, filed on Jan. 5, 2015.

(52) U.S. Cl.
CPC .. *G01V 2210/1214* (2013.01); *G01V 2210/24* (2013.01); *G01V 2210/3246* (2013.01); *G01V 2210/614* (2013.01)

(56) References Cited

U.S. PATENT DOCUMENTS

| | | | |
|---|---|---|---|
| 6,807,488 B2* | 10/2004 | van Borselen | G01V 1/288 |
| | | | 702/17 |
| 2009/0010103 A1* | 1/2009 | Sallas | G01V 1/005 |
| | | | 367/41 |
| 2010/0039894 A1 | 2/2010 | Abma | |
| 2012/0155217 A1* | 6/2012 | Dellinger | G01V 1/005 |
| | | | 367/38 |
| 2012/0269034 A1 | 10/2012 | Neelamani et al. | |
| 2013/0176819 A1 | 7/2013 | Poole | |
| 2014/0114578 A1 | 4/2014 | Sallas | |
| 2014/0303898 A1 | 10/2014 | Poole | |
| 2016/0154131 A1* | 6/2016 | Guillouet | G01V 1/375 |
| | | | 367/41 |
| 2018/0113230 A1* | 4/2018 | Guillouet | G01V 1/364 |

OTHER PUBLICATIONS

Araz Mahdad et al., "Separation of blended data by iterative estimation and subtraction of blending interference noise", Geophysics, May-Jun. 2011, pp. Q9-Q17, vol. 76, No. 3.

C.A. Van Der Schans et al., Angular-Dependent Signature Deconvolution, SEG conference proceedings, 1983, pp. 433-435.

Dan Hampson, "Inverse Velocity Stacking for Multiple Elimination", Journal of the Canadian Society of Exploration Geophysicists, Dec. 1986, pp. 44-55, vol. 22, No. 1.

Daniel Trad et al., "Latest views of the sparse Radon transform", Geophysics, Jan.-Feb. 2003, pp. 386-399, vol. 68, No. 1.

Peeter Akerberg et al., "Simultaneous source separation by sparse Radon transform", SEG Las Vegas 2008 Annual Meeting, Nov. 9-14, 2008, pp. 2801-2805.

\* cited by examiner

PROCESSING SEISMIC DATA ACQUIRED USING MOVING NON-IMPULSIVE SOURCES

CROSS REFERENCE TO RELATED APPLICATIONS

The present application is a National Stage of PCT Application No. PCT/IB2015/002626, filed Dec. 18, 2015, which claims priority and benefit from U.S. Provisional Patent Application No. 62/099,676, filed on Jan. 5, 2015, for, "Methods for non-impulsive source corrections;" U.S. Provisional Patent Application No. 62/110,849, filed on Feb. 2, 2015, for, "Deblending of seismic recording on moving receivers of moving arbitrary continuous sources with single inversion;" U.S. Provisional Patent Application No. 62/116,577, filed on Feb. 16, 2015, for, "Methods for non-impulsive source corrections;" and U.S. Provisional Patent Application No. 62/168,975, filed on Jun. 1, 2015, for, "Methods for non-impulsive source corrections," the entire contents of which are incorporated herein by reference.

BACKGROUND

Technical Field

Embodiments of the subject matter disclosed herein generally relate to seismic data processing, more particularly, to processing seismic data acquired using moving non-impulsive sources.

Discussion of the Background

Seismic surveys are used to acquire data, which is then processed to generate a profile (image) of geophysical structures under the ground (subsurface). This type of profile is used to search for oil and gas reservoirs. A high-resolution image of the underground rock formation is important, for example, to those who need to determine where and how to drill to reach such reservoirs.

In marine seismic surveys, the seismic source (which generates seismic excitations penetrating the explored structures) is usually made up of a number of air guns (e.g., 20 to 50 guns) attached to air compressors on board a vessel via hoses. The air guns are normally fired in a synchronized manner to output an excitation having generally an impulsive signature. The main pulse is followed by bubble pulse energy, generated as the air bubbles generated by the air guns rise and collapse. Even though the source (known as "air-gun array") is moving behind the vessel, after the air bubble from each gun has entered the water, it becomes near stationary due to drag. An air bubble rises slowly to the water surface as it pulsates, usually with at a velocity of about 1 m/s. The impulsive nature of the synchronized air-gun array along with drag effects on the bubbles means that the signature from conventional air-gun arrays can often be considered as emitted at a stationary location. The signature of a source is a propagating energy 3D distribution resulting from merging energy generated by each individual gun and the water-surface reflection thereof, far enough from the source so that the propagating energy 3D distribution no longer changes with distance from the source. An example of a far-field signature of such an air-gun array, including source ghost (due to the first reflection on the surface), is illustrated in FIG. 1.

The source signature may be calculated by a variety of means including modeling or inversion of near-field hydrophone data (e.g., with a hydrophone above each air gun), measured directly (e.g., with a hydrophone suspended far below the air-gun array), derived from streamer or ocean-bottom measurements, or other methods. During processing of seismic data acquired while using an impulsive source (e.g., an air-gun array), the signature may be represented by a wavelet.

In order to extract the explored underground formation's response from seismic data, source designature is applied to receiver-recorded data (known as seismic data). The source designature may consist of: (1) deriving a Wiener shaping filter to convert the signature to a desired wavelet, usually characterized by a zero phase and a broad bandwidth, and (2) applying the shaping filter to the data.

If the source emission is isotropic, the designature operator may be one-dimensional (e.g., based on a vertical far-field signature). If the source emits the energy differently in different directions, the source signature and associated designature algorithm may be two-dimensional (2D) or three-dimensional (3D). Such 2D approaches may be applied in the τ-p domain (where each slowness trace relates to a different source takeoff angle) or in the f-k domain are disclosed in "Angular-Dependent Signature Deconvolution," by Van der Schans, C. A. and Ziolkowski, A. M., SEG 1983 Conference Proceedings, pp. 433-435, and, "Marine source and receiver deghosting and array inversion in F—K space," by Hubbard, T. P., Sugrue, M. J., Sandham, W. A., and Booth, E. A., 46th EAEG Meeting 1984, Abstracts volume, p. 26, respectively. These methods are applicable in 2D or 3D, and when the seismic data is pressure or particle motion data (acquired using receivers such as accelerometer, differential pressure, geophone, etc.).

Seismic sources that emit energy for longer periods (i.e., non-impulsive) have been more and more frequently employed in seismic surveys. Such sources are used on land or in a marine environment (with detectors along towed streamers or placed on the seafloor or a combination thereof in a transition zone). Unlike the land sources, the marine sources (e.g., air guns, pingers or boomers fired with de-synchronized timing, marine vibrators, or a vessel whose hydrodynamic noise is used as an additional, low frequency source) typically also move while emitting energy.

The air guns, pingers or boomers fired with de-synchronized timing may be fired in a random or optimized non-synchronized pattern while towed. Alternatively, the air guns, pingers or boomers may be fired at regular time or space intervals, but with a pre-defined random/optimized timing (same timing for every location), a pre-defined random/optimized timing (different timing for every location) or a random timing for every location.

Marine vibrators may emit energy continuously or in bursts (i.e., chirps or sweeps, which can be linear, pseudo-linear, or non-linear). The de-synchronized impulsive sources and the vibrators may be combined in one source. For example, a combined source may include de-synchronized air guns and marine vibrators, both types of individual sources outputting low-amplitude continuous signals, which are complementary. Complementarity may refer to emitting more energy into the explored underground formation, for example extending the bandwidth. Alternatively, the de-synchronized air guns may emit energy across a full bandwidth, while the emission of the marine vibrator source elements may be tuned to 'top up' the energy level in a desired bandwidth (e.g., high frequencies which may be absorbed more or low frequencies, which may illuminate a target of interest). As yet another alternative, the de-synchronized air guns may yield signals with a frequency spectrum having a number of spectral notches relating to the firing timing, and then, the marine vibrators are tuned to emit energy at the notches frequencies to ensure the emission is not depleted in any given frequency range.

Processing data acquired using non-impulsive moving sources gives rise to more challenges than processing data acquired with impulsive and/or non-moving sources. One challenge is taking into consideration Doppler effect. The Doppler effect is related to a shift of detected frequency relative to the emitted frequency due to the motion of the source relative to the receiver. The change in frequency is given by the formula:

$$f = f_0 \frac{v + v_r}{v + v_s} \qquad (1)$$

where f is the detected signal frequency, $f_0$ is the emitted signal frequency, v is the energy (wave) propagation velocity, $v_s$ is the source velocity, and $v_r$ is the receiver velocity. This formula is valid for a homogenous medium (with same signal propagation velocity in all the volume), and for the energy traveling directly from the source to the receiver. When the source moves away from the receiver, the frequency decreases, and when the source moves toward the receiver, the frequency increases.

If the energy leaves the source in a near vertical direction (i.e., the takeoff angle from the source is perpendicular to the direction of motion of the source), no frequency change occurs due to source motion. If the energy incoming to the receiver is perpendicular to the receiver motion direction, again no Doppler shift (change of frequency) occurs. However, when energy leaves the source in a direction which is in-between parallel and perpendicular to the source's motion, only the source velocity component parallel to the propagation velocity causes a Doppler shift. Similarly, at the receiver side, only the receiver's velocity component parallel to the propagation velocity causes a Doppler shift.

In a horizontal isotropic media, if both the source and the receiver are moving at the same speed, the angle of energy leaving the source is equal and opposite to the angle incoming at the receiver. In this case, the Doppler shift is null, i.e., the detected signal frequency is equal to the emitted signal frequency. However, when there is a difference in the source takeoff angle and the receiver incoming angle relative to the respective direction of motions, a non-zero Doppler shift occurs (i.e., the detected signal frequency is different from the emitted signal frequency). Further discussion of Doppler shift in marine data acquisition can be found in U.S. Pat. Nos. 4,809,235 and 6,151,556.

In general Doppler shift effects in most marine settings will be small as the vessel speed (normally in the order of 2.5 m/s) is much smaller than the velocity of sound in water (normally in the order of 1500 m/s).

Another problem in processing data acquired using non-impulsive moving sources is ray-path variation. Due to the source's motion, the energy's path through the explored underground formation is continuously modified. The complexity of the explored formation (typically non-homogenous) often overshadows the simplistic approach to Doppler shifts as the energy's path is constantly changing.

Therefore, processing data acquired with non-impulsive moving sources needs to be developed beyond conventional methods used for non-impulsive and/or non-moving sources.

SUMMARY

According to an embodiment there is a method for processing seismic data related to a moving non-impulsive source. The method includes obtaining the seismic data, emitted signal data and an underground formation's response, UFR, estimate. The UFR represents reflections, diffractions, refractions and other wave propagations caused by the signal travelling through the surveyed underground formation, thus, including information relative to multiples, both internal and surface related. The method further includes calculating a cross-talk estimate using the emitted signal data and the UFR estimate, and obtaining a noisy UFR estimate using the seismic data and the emitted signal data. The cross-talk estimate is then subtracted from the noisy UFR estimate. The result of the subtracting may be further used to generate an image of the underground formation.

According to another embodiment, there is a method for processing seismic data acquired using a moving non-impulsive source, to explore an underground formation. The method includes obtaining the seismic data, emitted signal data and an UFR estimate, calculating a cross-talk estimate using the emitted signal data and the UFR estimate, subtracting the cross-talk estimate from the seismic data, and updating the cross-talk estimate using a result of the subtracting and the emitted signal data. The updated UFR estimate is usable in further processing of the seismic data to obtain an image of underground formation's structure.

According to another embodiment there is a method for processing seismic data related to a moving source emitting seismic signals whose frequency varies as a function of time. The method includes obtaining the seismic data and emitted signal data, and building a source-related operator based on the emitted signal data, and using the operator to determine an UFR estimate. The method further includes applying an inversion method to determine an underground formation's response, UFR, such that a convolution of the source-related operator with the UFR to be substantially equal to the seismic data. Applying of the inversion method includes performing a frequency dependent spatial resampling of a result of the convolution. The UFR estimate is usable to generate an image of underground formation's structure.

According to another embodiment there is a method for processing seismic data that includes obtaining seismic data recorded by a moving receiver following signals emitted by a moving source and acquisition-related data and extracting traces in a time window from the seismic data. The method further includes calculating a plane-wave-related operator using information included in the acquisition-related data and slopes of plane waves at the source side and at the receiver side. The information of the acquisition-related data provides a starting location of the receiver at a beginning of the time window, a source velocity, a receiver velocity, initial locations of the source when each of emission pieces in the time window start, respectively, time shifts between the beginning of the time window and when the emission pieces started, respectively, and directional spectra of each of the emission pieces. The method then includes determining an UFR estimate (under plane waves) via a single inversion, such that convolution of the plane-wave-related operator with the UFR estimate to be substantially equal to the traces. The inversion performs source motion correction, receiver motion correction and deblending simultaneously. The UFR estimate is further processed to generate an image of underground formation's structure.

According to yet another embodiment, there is a method for deblending seismic data acquired using sparsely distributed independently moving sources including at least one non-impulsive source. The method includes obtaining the seismic data and acquisition-related data, and dividing emissions of the at least one non-impulsive source in time pieces treated as stationary emissions. The method further includes solving two-dimensional, 2D, inversions for each of the sources and each of the time pieces, so that a receiver trace extracted from the seismic data is substantially equal to a combination of solutions of the 2D inversions.

According to yet another embodiment, there is a seismic data processing apparatus for processing seismic data related to a moving non-impulsive source to obtain an image of an explored underground formation. The apparatus includes an interface configured to obtain the seismic data, emitted signal data and an UFR estimate, and a data processing unit. The data processing unit is configured to perform at least one of the methods for processing seismic data related to a moving non-impulsive source to obtain an image of an explored underground formation, which methods are outlined in this section.

According to yet another embodiment, there is a non-transitory computer readable medium storing executable codes, which, when executed by a computer make the computer perform at least one of the methods for processing seismic data related to a moving non-impulsive source to obtain an image of an explored underground formation, which methods are outlined in this section.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

Figure 1:
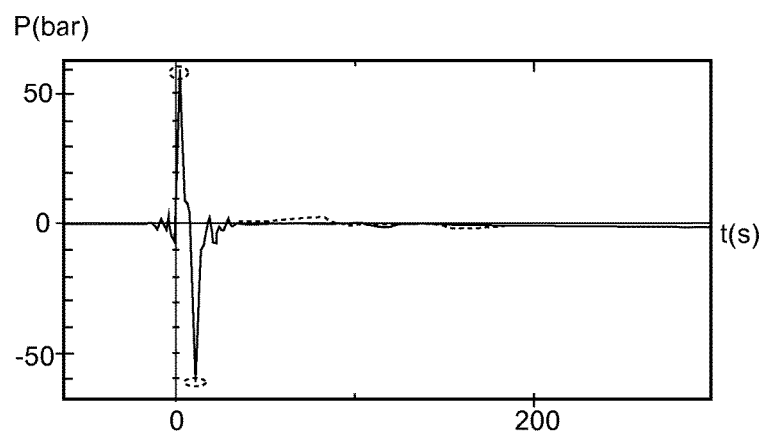
FIG. 1 illustrates an airgun source signature.

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed using terminology of seismic data acquisition and processing, but similar concepts may be used when processing of data acquired during other similar surveys (e.g., using electromagnetic signals). The seismic data may be acquired on land, marine or transition zone environments.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Embodiments described below are related to:
- inverting seismic data caused by non-impulsive moving sources, using spatial resampling;
- removing cross-talk from data acquired with non-impulsive moving sources, using emitted signal data and an underground formation response estimate, which may be iteratively enhanced; and/or
- seismic data inversion that compensates for a source's motion, or operates in the case of multiple independently moving sources.

Inverting Data Caused by Signals Emitted by Moving Sources and Whose Frequency Varies as a Function of Time A signal emitted by a non-impulsive source may be characterized by a pilot signal whose profile (amplitude versus time) may be stored to be used in seismic data processing. Alternatively or additionally, measurements of individual source parameters while emitting signal may be measured (e.g., using a hydrophone located close to the source, or a motion sensor on a piston used to generate the signal). The acquired signal (i.e., the receiver-recorded seismic data) is the result of convolution of the emitted signal with the explored underground formation's response (i.e., reflections and refractions of the incident signal at interfaces between layers of the underground formation along with multiples). During data processing, the imprint (signature) of the emitted signal in the seismic data is removed (i.e., an operation known as designature of the data) using correlation, deconvolution and/or inversion methods.

Designature of data relating to non-impulsive sources has been used in land seismic acquisition and processing, where the non-impulsive source is stationary while emitting the signal. In such cases, source signature compensation is often made through correlation of recorded data with a pilot signal of the source or a base plate (which moves due to the pilot signal to produce the emitted signal) measurement. The correlation corrects the phase of the acquired seismic data. Assuming that a flat spectrum with appropriate bandwidth has been emitted, the data is adequately converted to equivalent impulsive source data.

Fluctuations in the amplitude spectrum may be corrected by using a deconvolution operator rather than correlation. The deconvolution operator (t) may be designed to shape a known emitted waveform (s) to a desired impulsive signature (d):

$$d = s * f \qquad (2)$$

This relation may be formed as a linear equation. The deconvolution operator may be derived by least squares inversion, or some form of weighted/sparse inversion where the resulting operator is constrained (e.g., sparse).

The emitted signal may take many forms, such as: a sine wave, a linear sweep, a step sweep, a pseudo-random signal, pseudo-orthogonal sequences, etc. It may be advantageous to emit signals from one or more source such that subsequent separation of detected signals caused by signals emitted by different sources, to be eased. Thus, the emitted signals may be orthogonal or pseudo-orthogonal at different frequencies, or a mixture thereof.

If seismic data were acquired in a marine environment with a stationary non-impulsive source (e.g., a marine vibrator), data could have been processed using the same correlation/deconvolution method as in the land case. However, since in the marine environment the source is typically moving, the source corrections are much more complex, as described in WIPO (World Intellectual Property Organization) Publication WO 2015/011160. The resulting seismic wavefield may be recorded by one or more type of sensors, such as hydrophones, accelerometers, geophones, differential hydrophones, differential motion sensors, particle motion sensors, particle velocity sensors, etc. The sensors may be stationary (e.g., on the ocean bottom) or moving (e.g., carried by towed streamers or operating autonomously, for example drifting with current in the water layer).

A non-impulsive moving source may consist of an array of marine vibrators towed at the same or different depths. The vibrators may all emit the same signal, or may be configured to emit a variety of different signals. For the following discussion, a pseudo-random signal emitted by a marine vibrator is described in the time domain, but this approach may be applied in other domains, such as fx domain, wavelet domain, curvelet domain, ridgelet, FK domain, τ-p domain, or other domains. Although the receiver is considered fixed, the following approach applies for moving receiver data or is applied after a receiver motion correction step. In addition, the method may be applied in the common channel domain (the underground formation's response being sought between a moving source and a moving receiver).

The term "underground formation's response time" used in this document indicates the time needed to record all useful reflections emerging from the explored formation following an impulsive source emission. The term "emission time" indicates the duration of an emitted signal (e.g., a sweep length). Finally, the term "listening time" is the sum of the underground formation's response time and the emission time. The listening time is the time required to record all detectable reflections after start of emission.

If the emission time is short enough, the location of the moving source may be considered stationary. In practice, the stationary source assumption may be used when the change in an underground formation's response during the emission is negligible for a given frequency range of interest. This may be the case when the spatial mis-positioning due to source motion is smaller than that already accepted in the case of the streamer group length, commonly 12.5 m. Assuming a source motion of 2.5 m/s and an acceptable emission distance of 12.5 m, the emission duration of 5,000 ms is small enough for the source to be considered stationary. Depending on the spatial frequency of the underground formation's response and the desired resolution, shorter or longer emissions may be practical/necessary. While temporal frequency is related to sinusoids in the time direction, spatial-frequencies relate to sinusoids in the space direction. The spatial frequency of an underground formation relates to how quickly the event changes in space.

Figure 2:
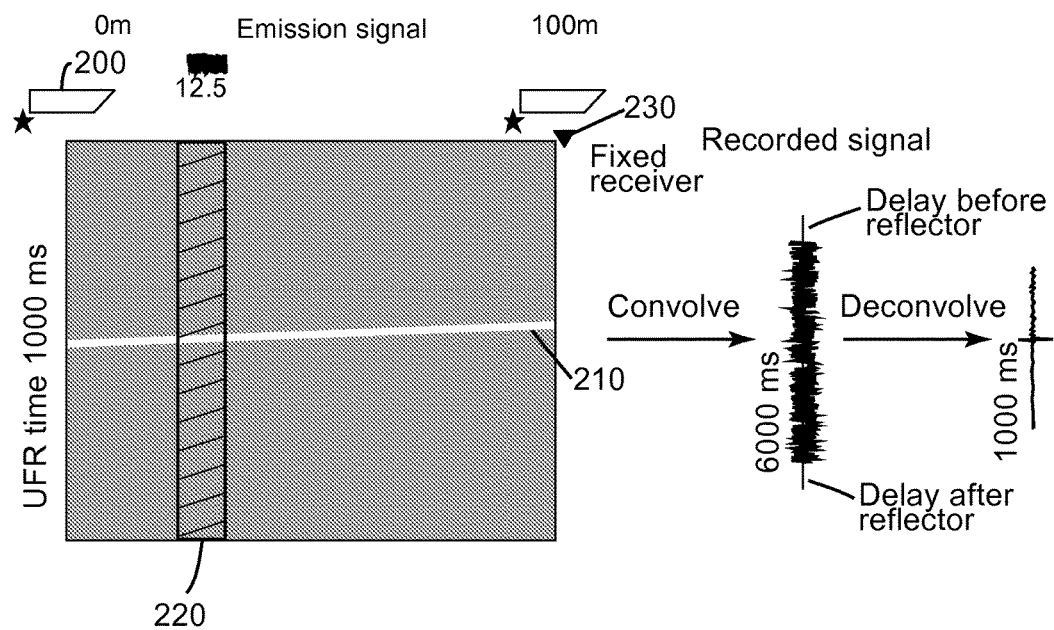
FIG. 2 illustrates emission, recording and designature of a short pseudo-random signal.

Thus, when a small burst of energy is emitted, the same strategy as that for land may be employed as illustrated in FIG. 2. The left graph in FIG. 2 is a vertical slice through the surveyed underground formation, the horizontal axis corresponding to distance traveled by the boat 200 carrying the non-impulsive source, and the vertical axis being depth expressed in terms of underground formation's response time (with a granularity of 5 ms, which is a sampling interval, SI). Line 210 represents a reflective interface inside the explored underground formation. The source emits energy for 5,000 ms, traveling meanwhile 12.5 m (marked by a rectangle 220 therein). The energy emerging from the underground formation is recorded by a fixed (i.e., stationary) receiver 230. The underground formation's response time being about 1,000 ms, listening time is about 6,000 ms listening time. The emission may be pseudo-random, pseudo-orthogonal, linear sweep, step sweep, pseudo-random linear or step sweep, chirps, or any other signal.

The recorded signal, which lasts 6,000 ms, is mathematically a convolution of the emitted signal and the underground formation's response. A source-effect free response, which lasts 1,000 ms and is illustrated on the right side of FIG. 2, is obtained by applying a designature method (e.g., deconvolution) to the recorded signal.

This data acquisition scenario is attractive for processing, but due to the short time during which the source is emitting, not enough energy penetrates the underground formation to yield a seismic image with an adequate quality (e.g., high signal/noise ratio). The assumption that the moving source is stationary (although it is not) makes performing a Doppler shift correction desirable. If a source Doppler shift correction is necessary, it may be applied in the receiver domain. Similarly, receiver Doppler shifts may be applied in the shot domain. Joint source and receiver shifts may be applied in the shot-receiver domain, a panel of data relating to data leaving a spatial window of source positions and being recorded in a spatial window of receivers. Doppler shift corrections may be applied as a time sample-by-time sample spatial shift or in a model domain, for example tau-p or FK domain.

In order to reduce the acquisition time, slip sweep acquisition may be used. Slip sweep acquisition may be based on emission of linearly-varying-frequency signals (knows as sweeps or chirps), the signal frequency being low (few Hz) at the beginning of the emission and increasing to high frequencies (over 100 Hz). Typically the low frequencies with deeper penetration are emitted first, and those with a more shallow penetration are emitted at the end. This data acquisition scenario allows a reduction in listening time by up to the emission time, the underground formation's response time for low frequencies being longer than the listening time for high frequencies.

The linear sweep may be combined with pseudo-random or pseudo-orthogonal emission, so that the emission frequency is increased during the emission, but in addition the signal has a pseudo-random phase. Such an emitted signal may be derived by calculating pseudo-random or pseudo-orthogonal signals, by emitting different bands in different time intervals (e.g., the different bands are different octaves: 4-8 Hz, 8-16 Hz, 16-32 Hz, 32-64 Hz, and 64-128 Hz), and/or by merging the signals together in overlapping time windows (e.g., emitting 0-1,000 ms at 4-8 Hz, 1,000-2,000 ms at 8-16 Hz, 2,000-3,000 ms at 16-32 Hz, 3,000-4,000 ms at 32-64 Hz, 4,000-5,000 ms at 64-128 Hz). Both an overlap between the time windows for different frequency ranges and emitting different frequency bands for different durations may be used.

Figure 3:
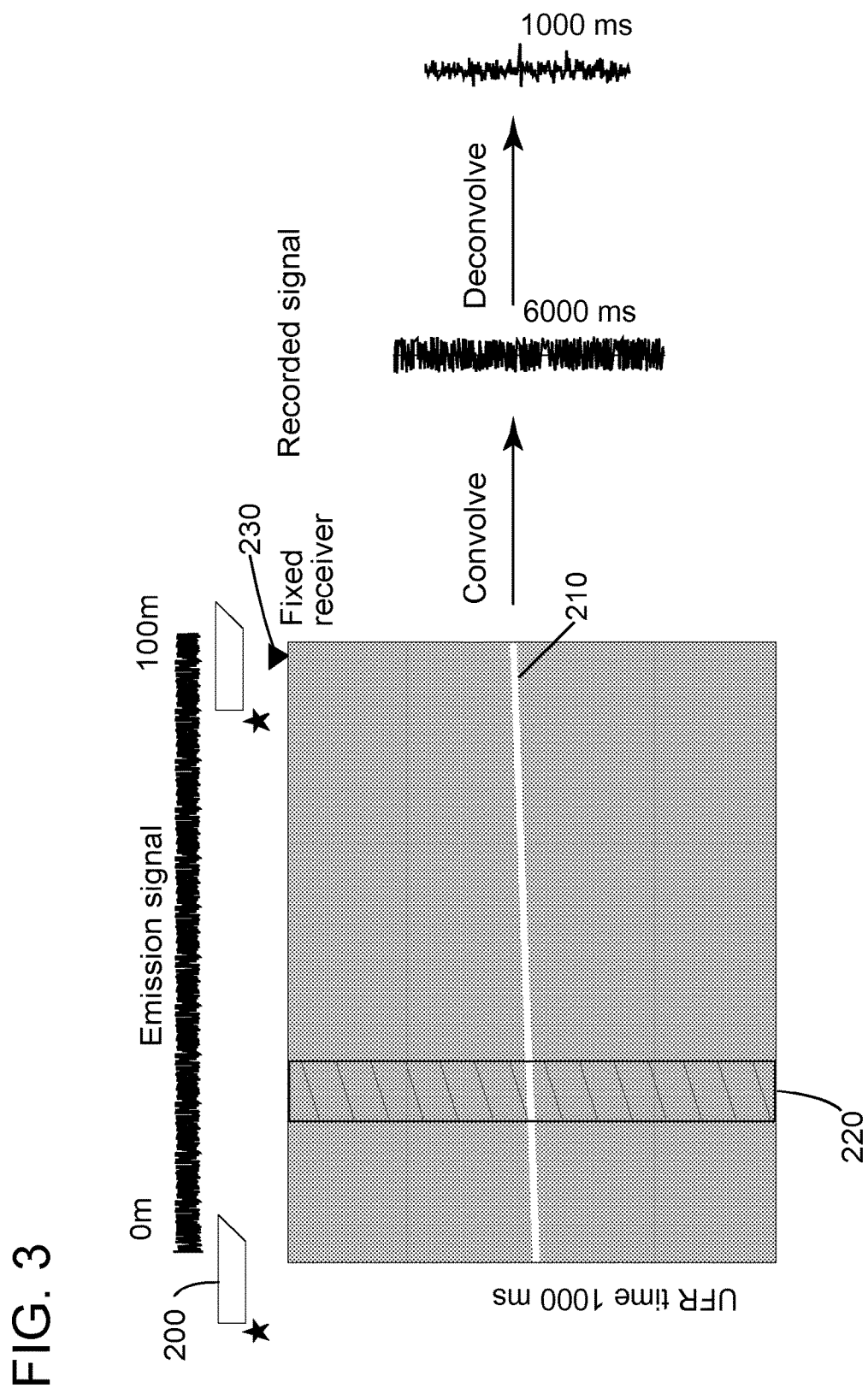
FIG. 3 illustrates emission, recording and designature of a continuous signal.

FIG. 3 (which is organized essentially as FIG. 2) illustrates a continuous emission scenario (i.e., the moving source emits throughout the 100 m traveled by the boat). In this case, a segment of data (labeled "Recorded signal" in FIG. 3) corresponding to the signal emitted during the rectangle 320 is extracted from the continuous recording trace to apply the correlation/deconvolution approach described relative to FIG. 2. While this processing should result in the same underlying signal, significant contamination noise is present in the output.

Figure 4:
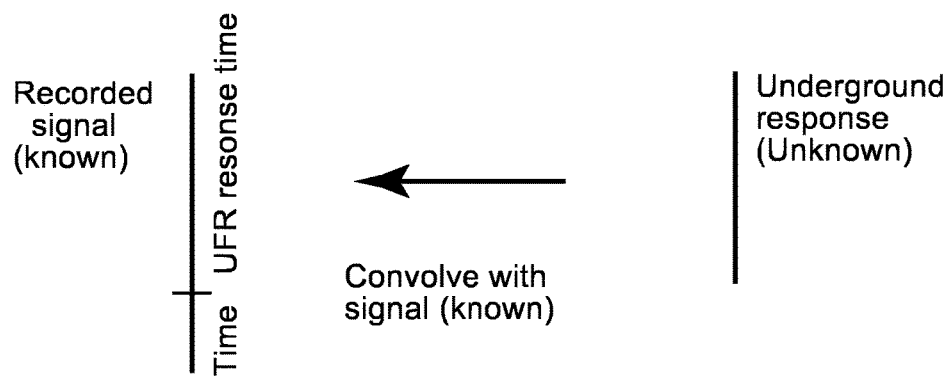
FIG. 4 illustrates temporal inversion.

An alternative to temporal deconvolution is a temporal inversion as schematically illustrated in FIG. 4. Mathematically, this inversion can be expressed as:

$$d = Lm \quad (3)$$

where d is the known recorded data (suggested by the left side data segment lasting the sum of the emission and underground formation's response time), m is the unknown underground formation's response (length relating to the underground formation's response time, suggested by the segment on the right side of FIG. 4) sought via the inversion, and L (suggested by the left-pointing arrow in FIG. 4) is a convolution with the known emitted signal. Equation (3) may be solved via any linear or non-linear solver, which may be modified so that the resulting underground formation's response is sparse (for example, as described in the article "Latest views of the sparse Radon transform," by Trad, D., Ulrych, T. and Sacchi, M., published in 2003 Geophysics, Vol 68, no 1, pp. 386-399).

Figure 5:
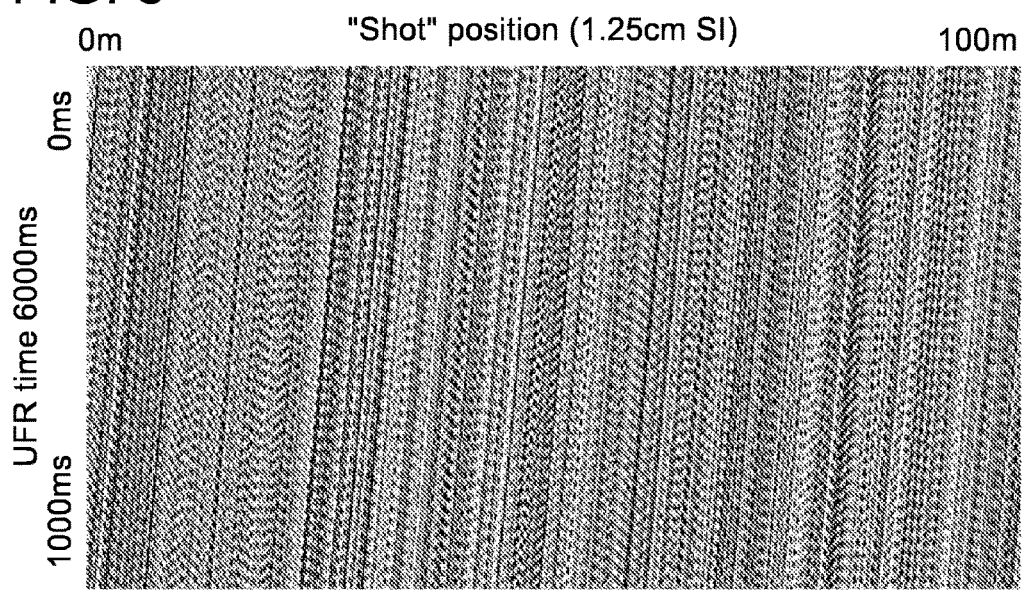
FIG. 5 illustrates trace segments selected from a continuous recording; relating to the underground formation's response on a fine spatial sampling.
Figure 6:
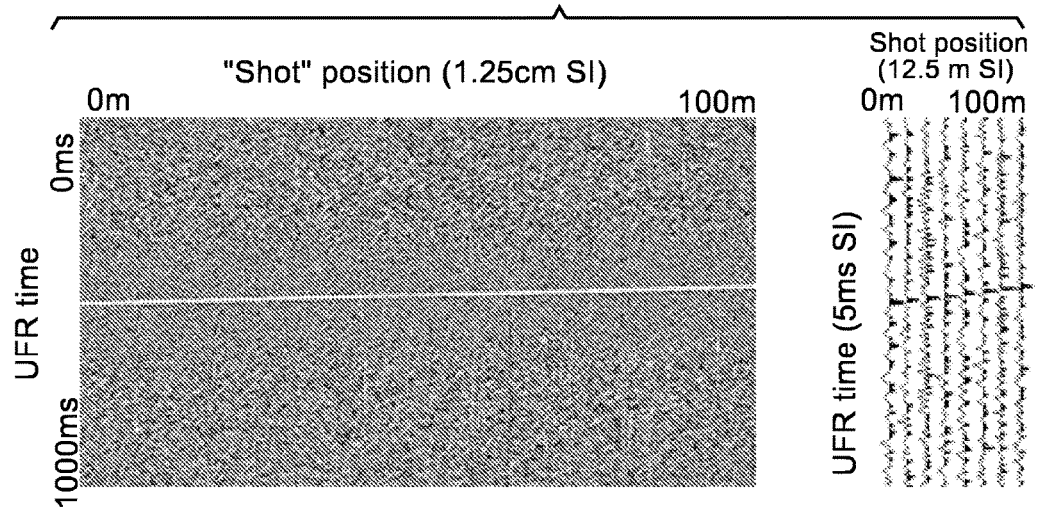
FIG. 6 illustrates results of a temporal inversion for data corresponding to 250 ms emission segments.

Instead of a single spatial position, a sliding spatial positioning based on the emission sampling and speed of the vessel may be considered. For example, a 2.5 m/s vessel speed multiplied by a 0.005 s emission interval yields a 0.0125 m spatial sampling as illustrated in FIG. 5. The temporal inversion problem stated earlier may be solved for data corresponding to 250 ms of emitted signal at each spatial (shot) position, yielding the results illustrated in FIG. 6. The graph on the left side of FIG. 6 illustrates the underground formation's response resulting from the inversion. The traces in the right side of FIG. 6 are extracted at 12.5 m sampling interval to provide an alternative illustration of these temporal inversion results.

Figure 7:
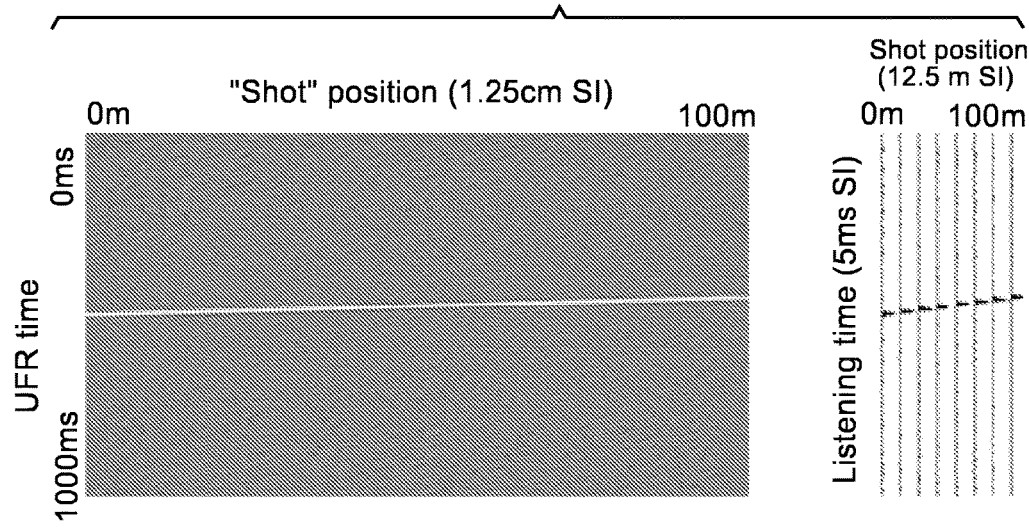
FIG. 7 illustrates results of a temporal inversion for data corresponding to 2,000 ms emission segments.

The use of a longer emission segment yields better noise cancellation as shown in FIG. 7 (having the same format as FIG. 6), which illustrates results of a temporal inversion problem solved for data corresponding to 2,000 ms of emitted signal at each spatial position. The lesser noise is clearly visible when comparing the right side traces in FIGS. 6 and 7.

Figure 8:
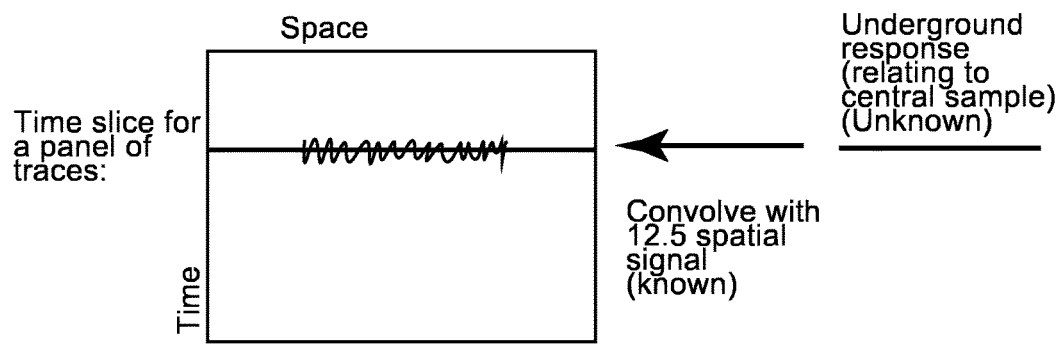
FIG. 8 illustrates spatial inversion.
Figure 9:
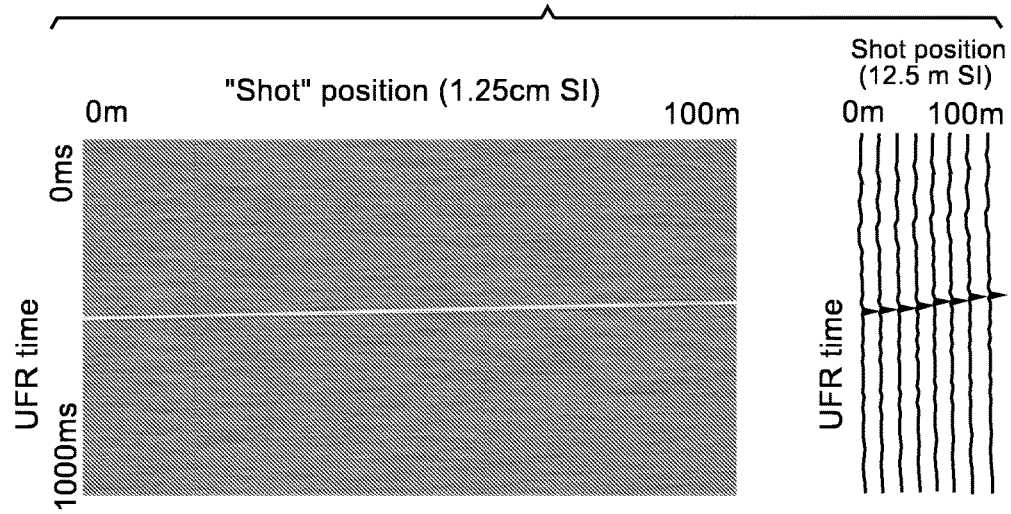
FIG. 9 illustrates results of a spatial inversion for data corresponding to 5 m emission segments.

Instead of performing a temporal inversion, inversion may be performed in the spatial direction. In this case, in equation 3, d is a spatial recording vector for a fixed time in the listening interval, m is a spatial vector of the underground formation's response for the fixed listening time, and L is a spatial convolution operator related to the emitted signal. Graphically spatial inversion is illustrated in FIG. 8. The resulting response (m) is a spatial vector which may have any length from a single point in space. The linear problem may be solved to output all spatial samples as illustrated in FIG. 9, which was obtained by spatial inversion using 5 m emission segments. FIG. 9 has a format similar to FIGS. 6 and 7. The spatial sampling parameters may be defined as required.

Figure 10:
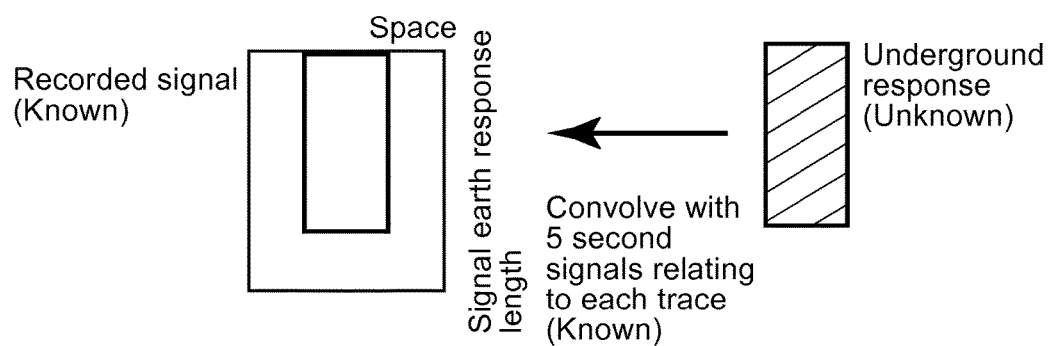
FIG. 10 illustrates a spatio-temporal inversion.

Temporal and spatial inversion may be combined to form a spatio-temporal inversion. In this case, the convolution becomes a spatio-temporal convolution as illustrated in FIG. 10 (which has a format similar to FIGS. 4 and 8).

Figure 11:
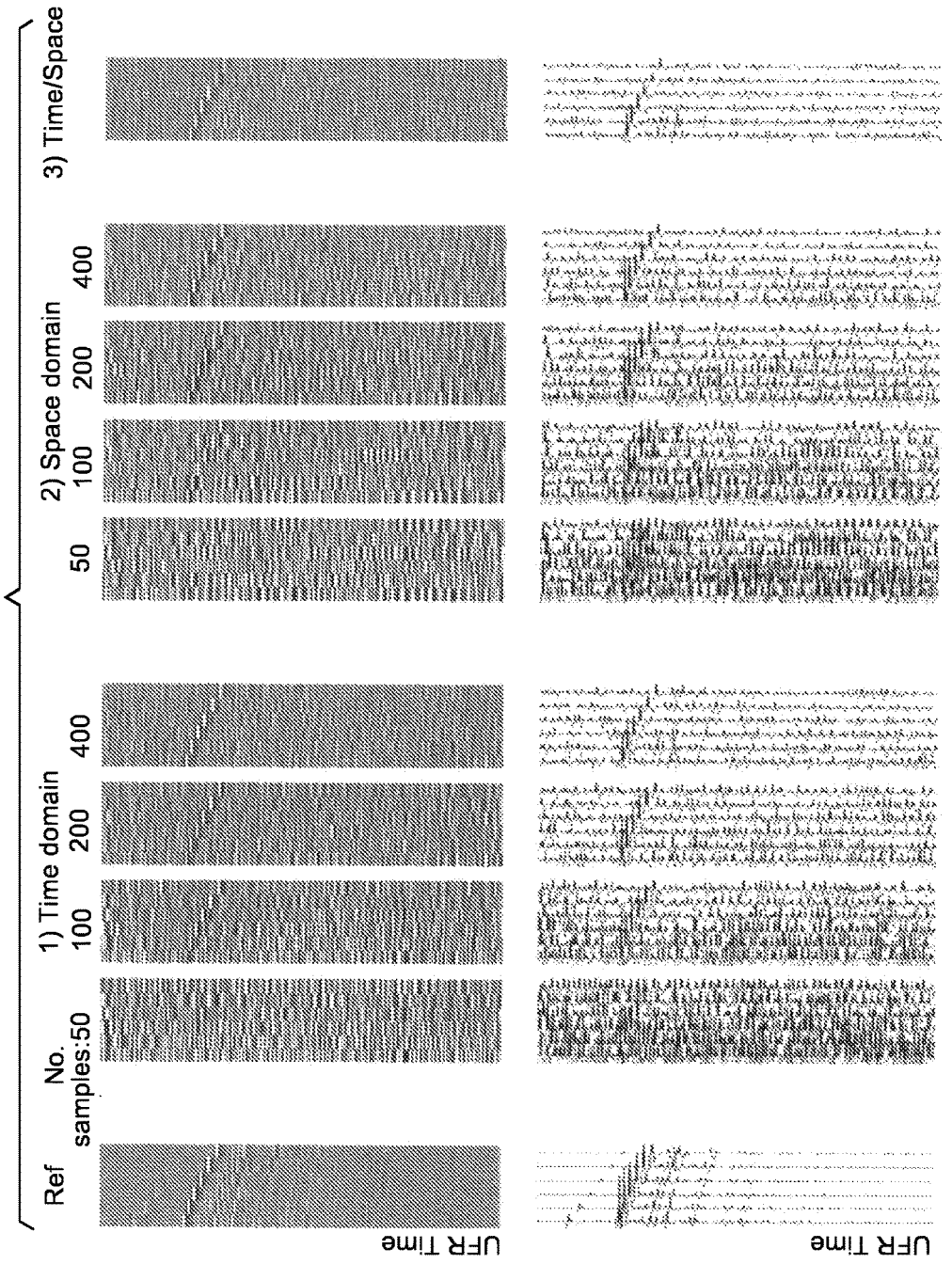
FIG. 11 illustrates inversion results obtained using temporal, spatial or spatio-temporal inversions applied to different numbers of samples, for the same space-time window.

The spatio-temporal inversion has been tested on a real dataset where the dynamic range of the data is challenging due to the strong shallow reflections that create strong contamination noise overlapping weak deeper reflections. Results obtained using different inversion methods applied to different numbers of samples related to the same space-time window are illustrated in FIG. 11. The inversion may begin with low frequencies to avoid aliasing at high frequencies. The result of spatio-temporal inversion has a lower noise content compared to other approaches.

Any of the overlapping or multi-source seismic data may be separated (operation known as deblending) using various methods such as: a correlation or a deconvolution with the emission, an inversion, and an iterative cleaning method discussed later in this document. The deblending may be performed simultaneously or successively with: a source motion correction, a Doppler shift correction, a receiver motion correction, a source separation, a designature (e.g., directional designature), a ghost compensation at the source and/or receiver side, and/or a spatial resampling or interpolation, which is discussed below.

The conventional deconvolution separates data in records corresponding to different sources or source emissions, but does not take into consideration source position's variation with time (i.e., moving sources). The results are datasets indicative of impulsive sources, but in fact, for non-impulsive moving sources, the source's position and the emitted signal's frequency change in time (it can be considered that the source position is a function of the emitted frequency, or vice-versa, the emitted frequency is a function of the source position). This problem may be overcome by a multi-stage processing method including frequency dependent spatial resampling. The frequency dependent spatial resampling realigns the emitted energy (line 1220 in FIG. 12) to represent that of an impulsive emission (vertical line 1210 in the graph in FIG. 12).

In one embodiment, the frequency dependent spatial resampling includes:
transforming the seismic data from a time-position domain to a frequency-position domain to obtain transformed data;
spatial resampling the transformed data for each frequency to shift emission positions; and
reverse transforming the resampled transformed data from the frequency-position domain to the time-position domain.

The frequency dependent spatial resampling may be applied with a spatial convolution, for example, a phase shift or sinc interpolation filter. Alternatively, the spatial resampling may be applied within an inversion scheme defined to find a spatially consistent output (to re-create the recorded data). This inversion may be linear or non-linear and may utilize sparseness weights which may be derived on low frequencies to dealias high frequencies.

Figure 12:
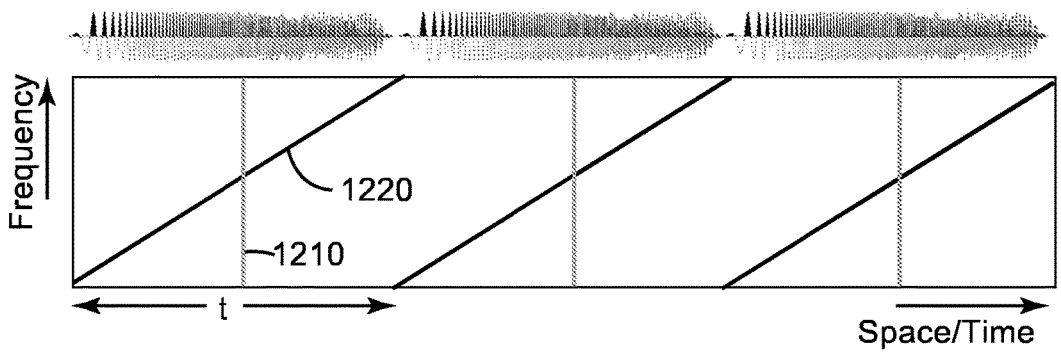
FIG. 12 illustrates frequency dependent spatial resampling.

The frequency dependent spatial resampling may move energy at the end of the sweep to the start of the sweep, energy at the start of the sweep to energy at the end of the sweep, or to any other position (in FIG. 12, energy it is moved to an intermediary position). Optionally, the extent at which high frequencies are moved may be limited, and preferentially, low frequency energy may be moved so as the result to be less spatially aliased. Different domains for the frequency dependent spatial resampling may be used (e.g. Fourier, Laplace, z-transform, wavelet, FK, τ-p, curvelet, etc.) The inversion may use sparseness or high resolution weights.

Figure 13:
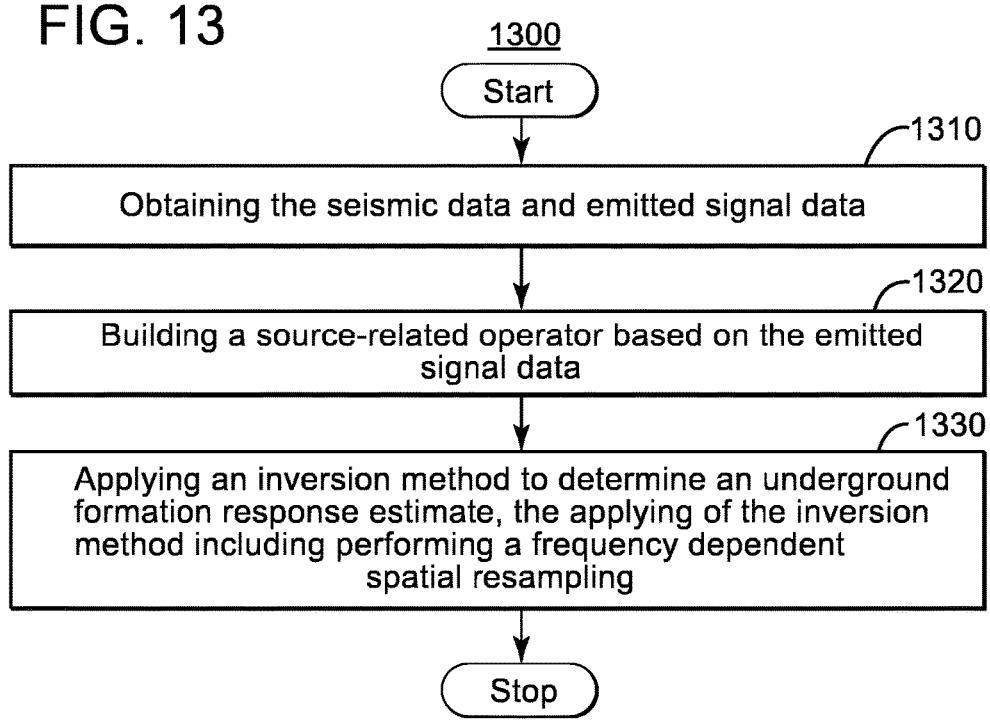
FIG. 13 is a flowchart illustrating a method for processing seismic data acquired using a moving source emitting seismic signals whose frequency varies as a function of time, according to an embodiment.

FIG. 13 is a flowchart of a method 1300 employing spatial resampling according to an embodiment. Method 1300 includes, at 1310, obtaining the seismic data, which has been acquired using a moving source emitting seismic signals whose frequency varies as a function of time, and emitted signal data. The seismic data and the emitted signal data may be received from outside the computer executing the method stored in a memory internal to the computer or an external memory (connected to the computer). The emitted signal data includes information about emissions, such as the moment when an emission started, the frequency variation with time during the emission, the position and velocity of the source when the emission has started. If multiple sources are used (at least one of the sources being a non-impulsive moving source), information about each of the sources' emissions is included in the emitted signal data.

Method 1300 further includes building a source-related operator based on the emitted signal data at 1320. Method 1300 then includes applying an inversion method to determine an underground formation's response estimate at 1320. The underground formation's response estimate is determined such that a convolution of the source-related operator with the underground formation's response estimate is substantially equal to the seismic data. In method 1300, applying the inversion method includes performing a frequency dependent spatial resampling of the seismic data. The underground formation's response estimate is further used to generate an image of underground formation's structure.

The data may be spatially interpolated before spatial resampling to reduce the impact of aliasing. For example this may be applied with fx-interpolation, Gulunay interpolation, high resolution Radon interpolation or another scheme capable of interpolating beyond aliasing.

Cross-Talk in Seismic Data

Figure 14:
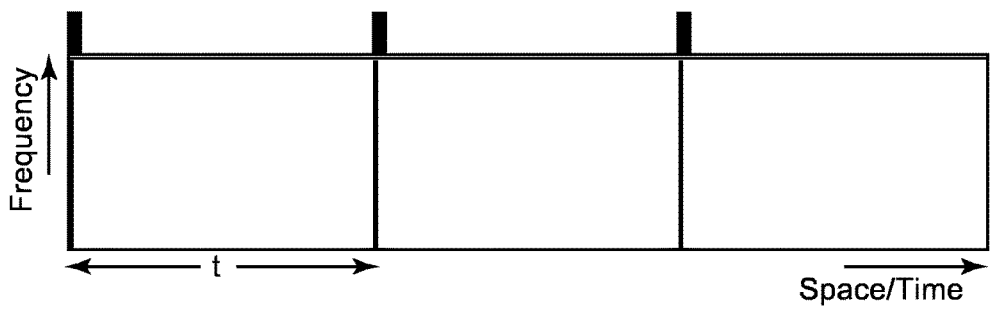
FIG. 14 illustrates impulsive source signals emitted at regular intervals equal to the listening time.
Figure 15:
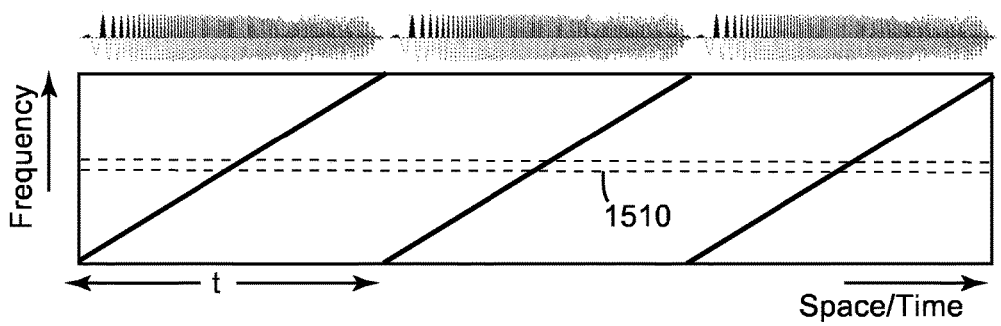
FIG. 15 illustrates linear sweep signals emitted at regular intervals equal to the listening time.

For a single impulsive source, the emitted frequency versus time is essentially a Dirac function which has the effect of outputting all frequencies at the same point in space as illustrated in FIG. 14. The energy emitted by a non-impulsive source performing a linear sweep has a frequency dependence of time as illustrated in FIG. 15. FIGS. 14 and 15 illustrate sources activated with a periodicity (activation time interval) equal to the underground formation's response time t (i.e., the time we would need to record all useful reflections of interest following an impulsive source emission). Amplitude dependence of time for the emitted signals is schematically illustrated above each graph. Assuming emission by a source moving with constant velocity, the labelling of the horizontal axis may also relate to space.

In the case of the linear sweep in FIG. 15, the receiver records an overlap of energy of different frequencies. However, for a given frequency (as per the dotted box 1510), the emission at a given frequency is followed by a delay equal to the underground formation's response time t before the same frequency is emitted again. In the case of a single source (impulsive or non-impulsive), if the source is activated (activation known as "shot" in case of an impulsive source) no sooner than at an interval equal to the underground formation's response time, there is no cross-talk for a given frequency.

Figure 16:
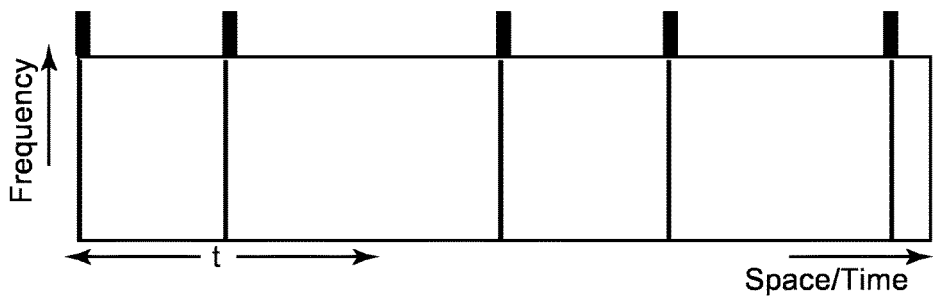
FIG. 16 illustrates impulsive source signals emitted at random intervals less than the listening time.

If the activation time interval is less than the underground formation's response time (as illustrated for an impulsive source in FIG. 16 and for a non-impulsive source operating according to a linear sweep in FIG. 17), late-arriving reflections due to one source activation may overlap with early reflections due to a next source activation. This overlap of reflections due to different activations is similar to cross-talk contamination (also known as blend noise) when two or more impulsive sources are used. In this latest case, a technique employed to ease seismic data deblending (i.e., separating information due to the different shots) is randomizing the time interval between shots, so that the cross-talk noise becomes irregular from shot to shot. This irregularity helps make the signals orthogonal and is beneficial for deblending.

Figure 17:
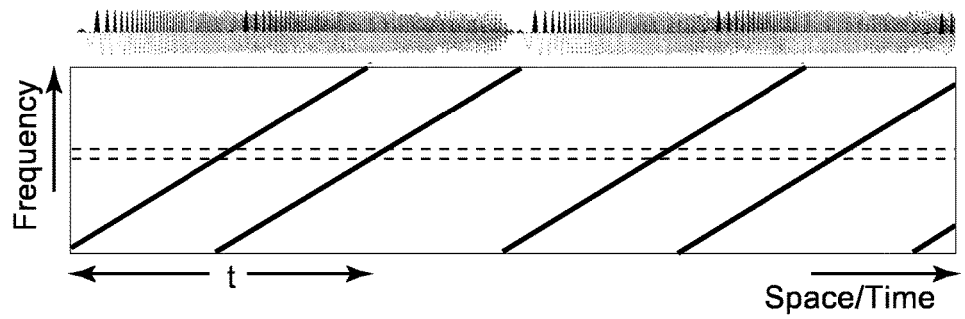
FIG. 17 illustrates linear sweep signals having the same frequency versus time slope and emitted at random intervals less than the listening time.
Figure 18:
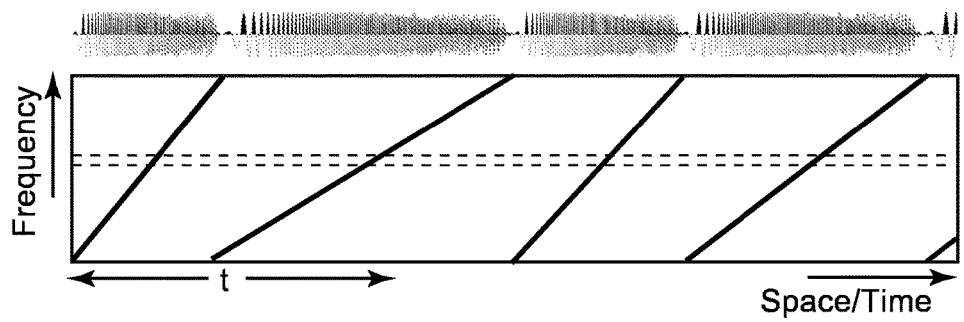
FIG. 18 illustrates linear sweep signals with different length (or, in other words, different frequency versus time slopes)

FIG. 17 illustrates that more than one frequency may be emitted at the same time by a non-impulsive source. However, the spatial sampling for a given frequency has the same irregularity as the impulsive source in FIG. 16. Alternatively, as illustrated in FIG. 18, the sweep length may vary from sweep to sweep, emitting more than one frequency at the same time being avoided.

In case of pseudo-random or pseudo-orthogonal emissions, substantially all frequencies are emitted at all times. The pseudo-random or pseudo-orthogonal emission has the potential benefit of better spatial sampling, but may also have the drawback of cross-talk noise. The phase encoding in pseudo-orthogonality helps signal separation.

Figure 19:
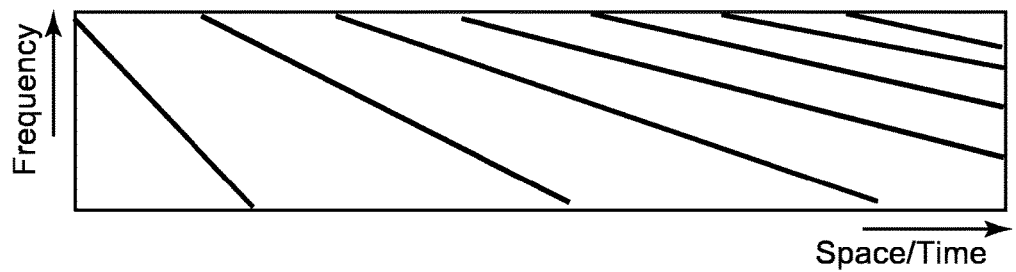
FIG. 19 illustrates linear sweep signals for which the time interval between emitting higher frequencies is shorter than the time interval between emitting lower frequencies.
Figure 20:
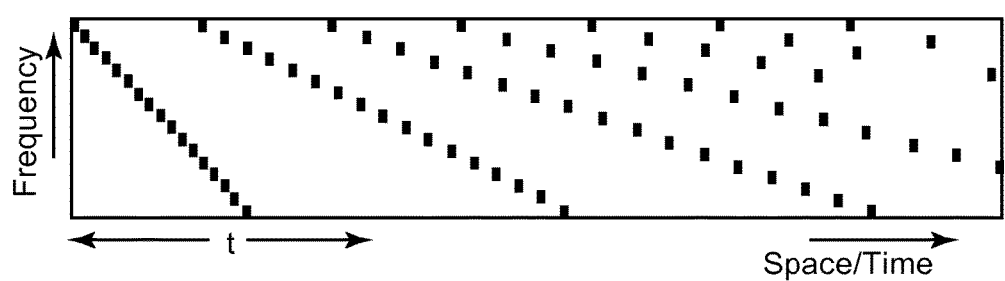
FIG. 20 illustrates down-step sweep signals for which the time interval between emitting higher frequencies is larger than the time interval between emitting lower frequencies.

Listening time may vary with frequency within the survey range of frequencies (for example, up to 150 Hz), the higher frequencies being typically attenuated more quickly in the underground formations than lower frequencies. Therefore, the higher frequencies may have a shorter underground formation's response time than the low frequencies. FIG. 19 illustrates a linear sweep and FIG. 19 illustrates a step-down sweep in which the time interval between the higher frequency signals is shorter than for the lower frequency ones. Note that both linear sweeps starting from lower frequencies and step-up sweeps may have shorter intervals between repeating higher frequencies than repeating lower frequencies as in FIGS. 19 and 20.

An activation time interval shorter than the underground formation's response time gives rise to cross-talk noise even when a single source is used. Some sort of orthogonality within the listening time is then used to subsequently separate the energy from different sweeps (different frequencies). With linear sweeps or chirps, this orthogonality may be provided by spectral orthogonality. If sweeps are repeated more quickly than the underground formation's response time, a randomized timing may provide a sort of semi-orthogonality. In the case of pseudo-random or pseudo-orthogonal emissions, phase encoding may provide the necessary orthogonality. Note that here the term "linear sweeps" includes up-sweeps, down-sweeps and step-sweeps. In addition non-linear sweeps may be used, in a non-linear sweep different frequencies being emitted different amounts of time.

Spatial sampling is related to how often emission is repeated. Note that that the spatial sampling in some of the linear sweep cases is also offset for different frequencies. In addition, spatial sampling may be non-uniform. Since all frequencies are emitted at the same time in pseudo-orthogonal/random emission, the spatial sampling may then be continuous. The use of phase encoding (pseudo-random or pseudo-orthogonal emission) may be combined with linear/chirp sweeps. For example, this may be achieved by:
  generating a pseudo-orthogonal emission sequence,
  using a bandpass filter or wavelet transform generating a pseudo-orthogonal or pseudo-random emission for a number of times relating to different frequency ranges,
  combining the pseudo-orthogonal emission at different time intervals with temporal tapers (e.g., 1-2 Hz from 0-1 second, 2-4 Hz from 1-2 seconds, 4-8 Hz from 2-3 seconds, 8-16 Hz from 3-4 seconds, 16-32 Hz from 4-5 seconds, 32-64 Hz from 5-6 seconds, 64-128 Hz from 6-7 seconds).

Turning now to the case of dual sources (known for impulsive sources as simultaneous shooting), receiver-recorded data is at least for a part of the recording time an overlap of signals caused by at least two sources. The sources may be towed by different vessels and thus move with different velocities. Alternatively the two sources may be towed by the same vessel. Although the following discussion focuses on two sources, the described methods can be applied for more than two sources.

FIGS. 21-30 illustrate emission methods for two sources, the signals emitted by a first source being illustrated using black lines, and the signals emitted by a second source being illustrated using grey lines. The emitted amplitudes' variations with time is illustrated in bands above the frequency versus time graphs in these figures (the upper band for the first source, and the lower band for the second source).

Figure 21:
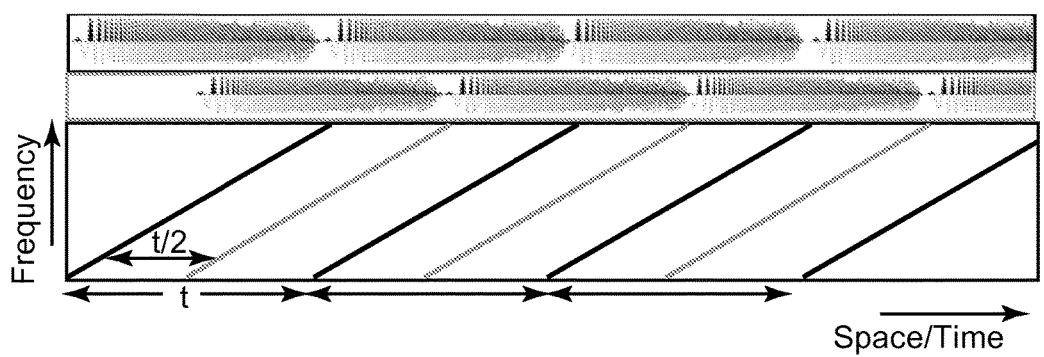
FIG. 21 illustrates frequency evolution of signals emitted by two non-impulsive marine sources according to an embodiment.

In FIG. 21, a first source emits linear sweep signals, each sweep lasting a time interval equal to underground formation's response time t. The second source emits similar linear sweep signals also lasting the underground formation's response time t, the second source signals being emitted t/2 later than the first source signals. While each source is self-orthogonal (i.e., a source emitting any frequency signal only during a continuous period within the listening time), in the receiver-recorded data, the second source signals produce cross-talk noise relative to the first source-related reflections and vice-versa (the first source signals produce cross-talk noise relative to the second source-related reflections). The repetitive nature of the cross-talk makes it challenging to deblend the receiver-recorded data and lowering cross-talk noise in de-blended data.

Figure 22:
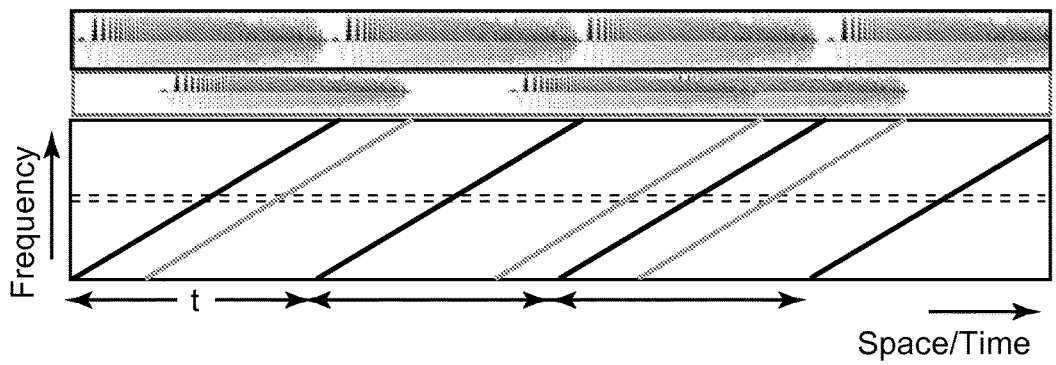
FIG. 22 illustrates frequency evolution of signals emitted by two non-impulsive marine sources according to an embodiment.
Figure 23:
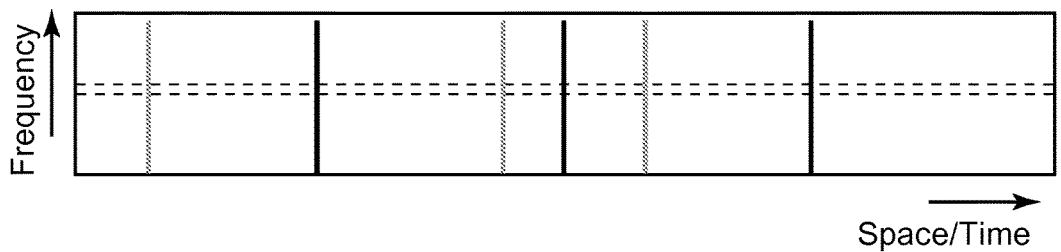
FIG. 23 illustrates impulsive sources emitting at variable time intervals.

In one embodiment, the sweep start time of the second source's emission relative to the first source's emission may vary for successive first-second source emission pairs (while the intervals between successive first source emissions remain equal to the listening time) as illustrated in FIG. 22. This method of activating the sources is a dual source correspondence of the situation illustrated in FIG. 17, and is the non-impulsive source equivalent to randomized or dithered acquisition using impulsive sources illustrated in FIG. 23. Random activation of one source relative to another has been used to deblend data in the case of impulsive sources. The deblending approaches designed for non-impulsive sources also benefit from this type of random timing activation.

Figure 24:
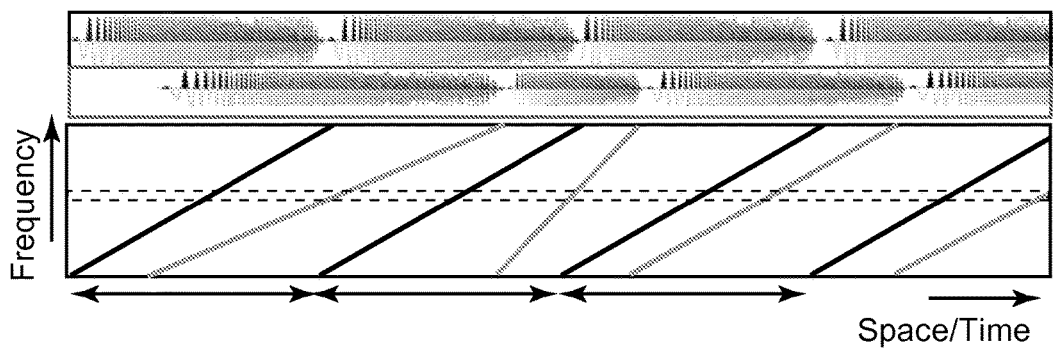
FIGS. 24-30 illustrate frequency evolution of signals emitted by two non-impulsive marine sources according to various embodiments.

One drawback of the method in FIG. 22 is that for some of the time, the second source does not emit, and at other times it emits more than one frequency. This drawback may be overcome by modifying the sweep lengths of the second source to be consistent with the sweep start times as illustrated in FIG. 24.

Figure 25:
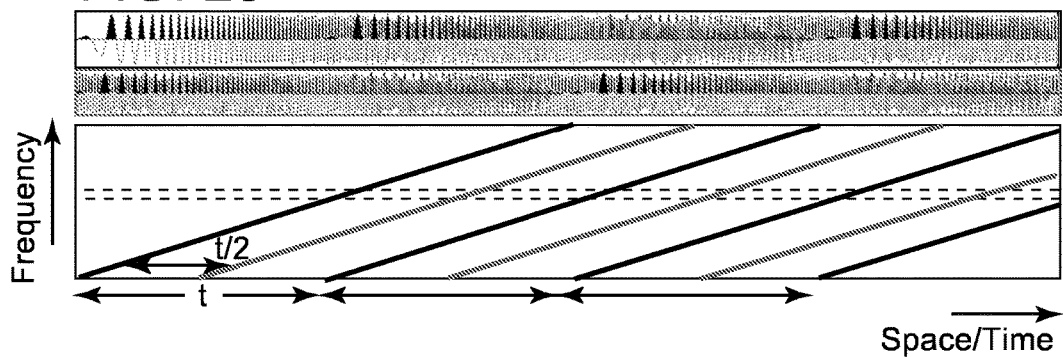

An alternative method is illustrated in FIG. 25, according to which two sources emit continuously signals according to linear sweeps lasting twice the underground formation's response time. In FIG. 25, the sweeps last 2t, and the delay between sweeps emitted by different sources is t/2. In this case, cross-talk noise occurs because, after the first source emits a signal with a given frequency, the second source emits the given frequency within the underground formation's response time for the first source-emitted signal.

Figure 26:
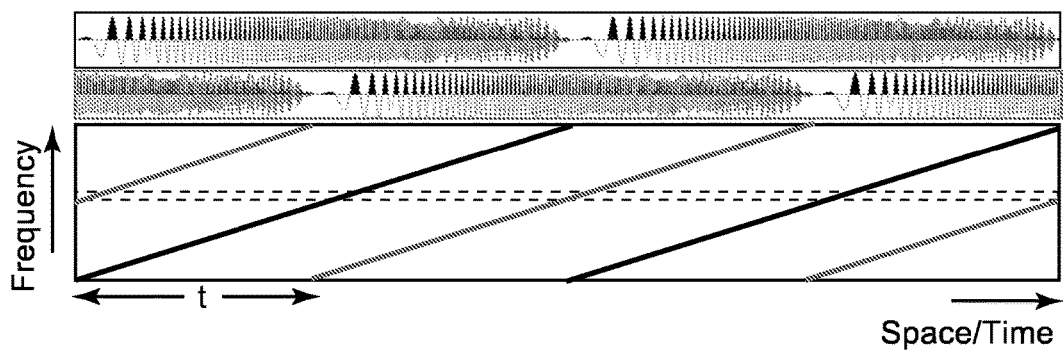

FIG. 26 illustrates a method in which, for sweeps lasting also twice the underground formation's response time, the delay between the first source sweep and the second source sweep is equal to the underground formation's response time. In this case, there is always an underground formation's response time t before the same frequency is re-emitted by any source. This method maintains full frequency-based emission orthogonality, which substantially eases de-blending. In this method, spatial sampling increases from vt/2 to vt, where v is the vessel speed (e.g., about 2.5 m/s).

Figure 27:
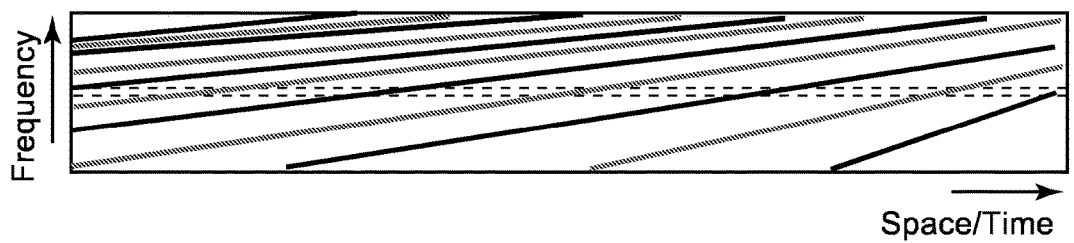

FIG. 27 illustrates a dual linear sweep method in which the time interval between different sources emitting the same frequency depends on the frequency being shorter for higher frequencies. If N sources are deployed, individual sweeps may be N times the underground formation's response time. The time interval between sequential sweeps of different sources may be equal to underground formation's response time t.

Figure 28:
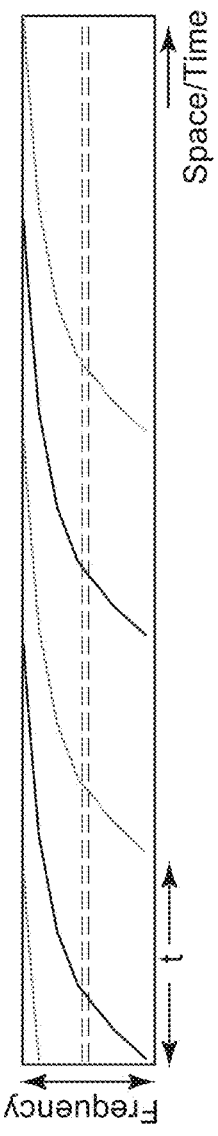

The above methods are not limited to linear sweeps. FIG. 28 illustrates non-linear sweeps designed such that energy to be emitted at the higher frequencies (which are attenuated more strongly with absorption) longer than at the lower frequencies. The absorption coefficient (Q) dependence of frequency may be used to design such a sweep. For example the composite emission may relate to an inverse Q-filter for a required bandwidth.

Figure 29:
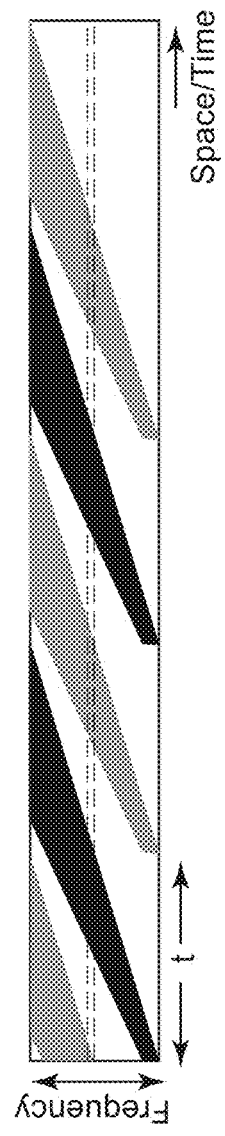
Figure 30:
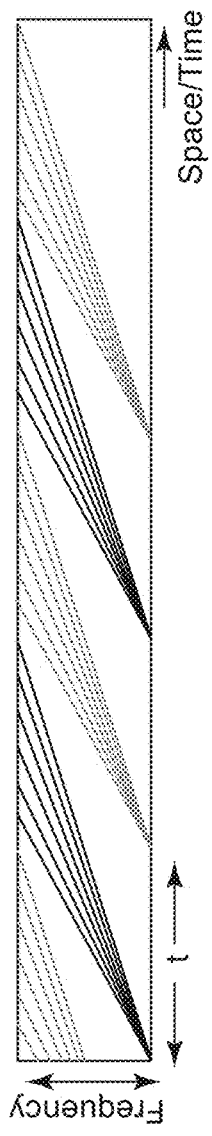

According to another embodiment, FIG. 29 illustrates a dual non-impulsive source emission method in which each source emits a range of frequencies while outputting more energy at higher frequencies. In yet another embodiment illustrated in FIG. 30, each non-impulsive source is an array of non-impulsive source elements. The source elements of an array start their sweep at the same moment, but their sweeps last different times.

Iteratively Cleaning Cross-Talk Noise

Noise levels may be reduced (additionally or alternatively to the previously-described spatial or spatio-temporal inversions) using a cross-talk removal method. Such a method may include:
1. receiving receiver-recorded data (known as "seismic data") related to emission from a moving non-impulsive source;
2. receiving an estimate of the underground formation's response between the source and the receiver;
3. receiving a source emission signal (e.g., a pilot signal);
4. estimating contamination (cross-talk) noise using the estimate of the underground formation's response and the source emission signal; and
5. attenuating cross-talk noise in the receiver-recorded data using the estimated contamination.

The above-processing may be iterated, each time refining the estimate of the underground formation's response. More than one estimate may be used and the underground formation's response may include multiples and free surface ghost effects. The cross-talk noise may relate to interference from the non-impulsive emission of a single source or relate to energy from more than one source. Once enough cross-talk noise has been removed, the de-noised data may be used to form equivalent impulsive source data with or without free surface ghost or with modified source characteristics. This approach may be used in different paradigms discussed below. Note that cross-talk and cross-talk noise may be used interchangeably, the cross-talk originally having been discussed in the previous section.

Figure 31:
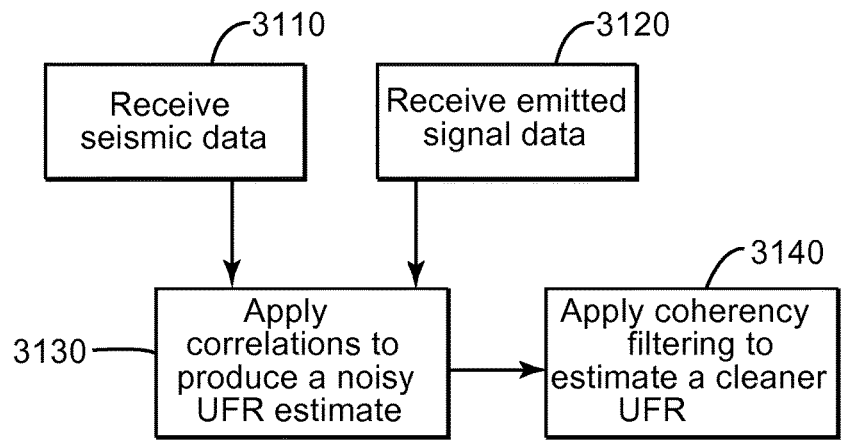
FIG. 31 is a block diagram of a method to estimate an underground formation's response.

Source deblending methods such as the ones described in WO 2015/011160 successively improve removal of cross-talk contamination while refining an underground subsurface response (UFR) estimate. The UFR estimate may be obtained using a coherency filter applied to correlation data, as summarized in FIG. 31. Seismic data (recorded by receivers) related to emission from a non-impulsive moving source is received at 3110, and emitted signal data (e.g., pilot signal) is received at 3120. A noisy underground formation's response estimate is obtained at 3130 by applying correlations between the seismic data and the emitted signal data. At 3140, a coherency filter is applied to the noisy underground formation's response estimate to obtain a cleaner underground formation's response estimate.

Figure 32:
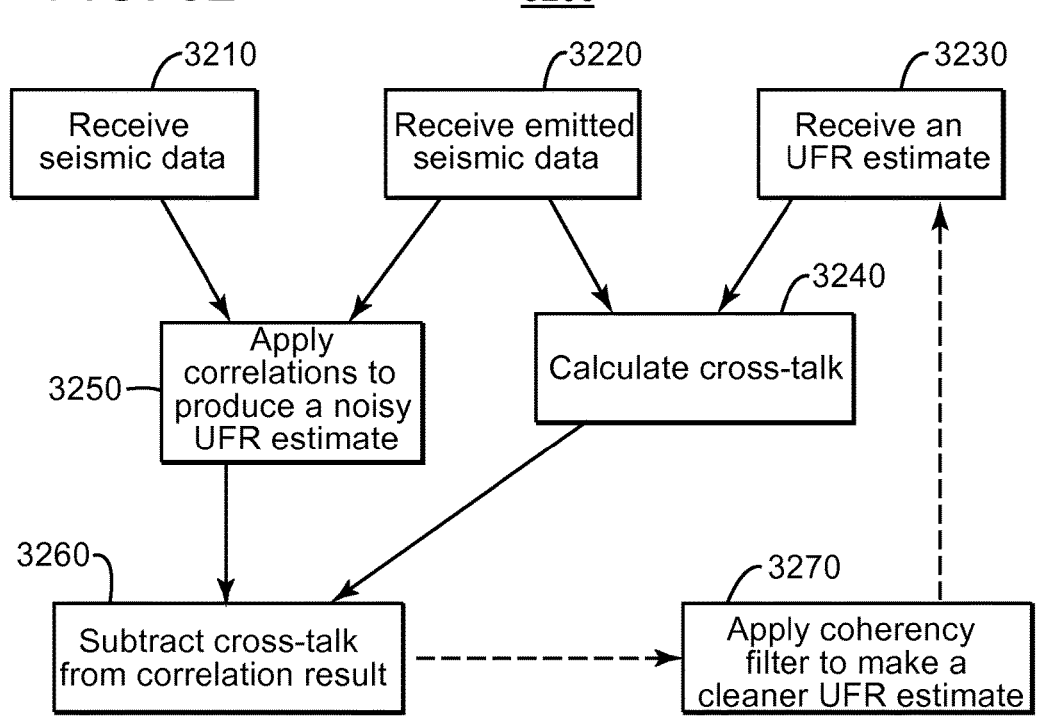
FIG. 32 is a block diagram of a method to estimate an underground formation's response according to an embodiment.

FIG. 32 is a block diagram illustrating a method 3200 for processing seismic data acquired using a non-impulsive moving seismic source, according to an embodiment. Method 3200 includes receiving the seismic data at 3210, emitted signal data at 3220 and an underground formation's response (UFR) estimate at 3230. At 3240, contamination noise (cross-talk) is estimated using the emitted signal data and the underground formation's response estimate. At 3250, a noisy underground formation's response estimate is obtained by applying correlations between the seismic data and the emitted signal data. Then, at 3260, the cross-talk noise is subtracted from the noisy underground formation's response estimate.

Steps 3240 and 3260 may be repeated (i.e., iterated). At each repetition (i.e., iteration), the underground formation's response estimate used for re-calculating the cross-talk is performed an enhanced estimate of the underground formation's response based on the result of the subtraction obtained in a previous iteration. Optionally, at 3270, a coherency filter (e.g., an f-x filter) may be applied to the result of the subtraction, to obtain an enhanced estimate of the underground formation's response.

The initial (i.e., at the first iteration) underground formation's response may be obtained from an inversion/deconvolution method. The inversion/deconvolution result may be enhanced by use of a coherency filter prior to first iteration. The initial underground formation's response may optionally be obtained using the method illustrated in FIG. 31. The initial UFR estimate may also be the result of a previous survey. More than one UFR estimate may be combined in the initial UFR estimate. The UFR estimate may include multiples and free surface ghost effects. The cross-talk noise may relate to interference from the non-impulsive emission of a single source or to energy from more than one source. Once sufficient cross-talk noise has been removed, noise-reduced data may be used to obtain equivalent impulsive source data with or without free surface or with modified source array characteristics.

The coherency filtering may include any operation to improve coherency. This may be a multi-trace operation and may, for example, involve common reflection surface (CRS) filtering, fx filtering, fx prediction filtering, rank reduction filtering, curvelet filtering, wavelet filtering, contourlet filtering, ridgelet filtering, SVD filtering, fx projection filtering, muting in a model domain (e.g., FK, parabolic radon, linear radon domain, other previously mentioned domain, or another domain).

Step 3250 of applying correlations may be replaced by a deconvolution or the temporal, spatial or spatio-temporal inversion method as previously outlined.

Figure 33:
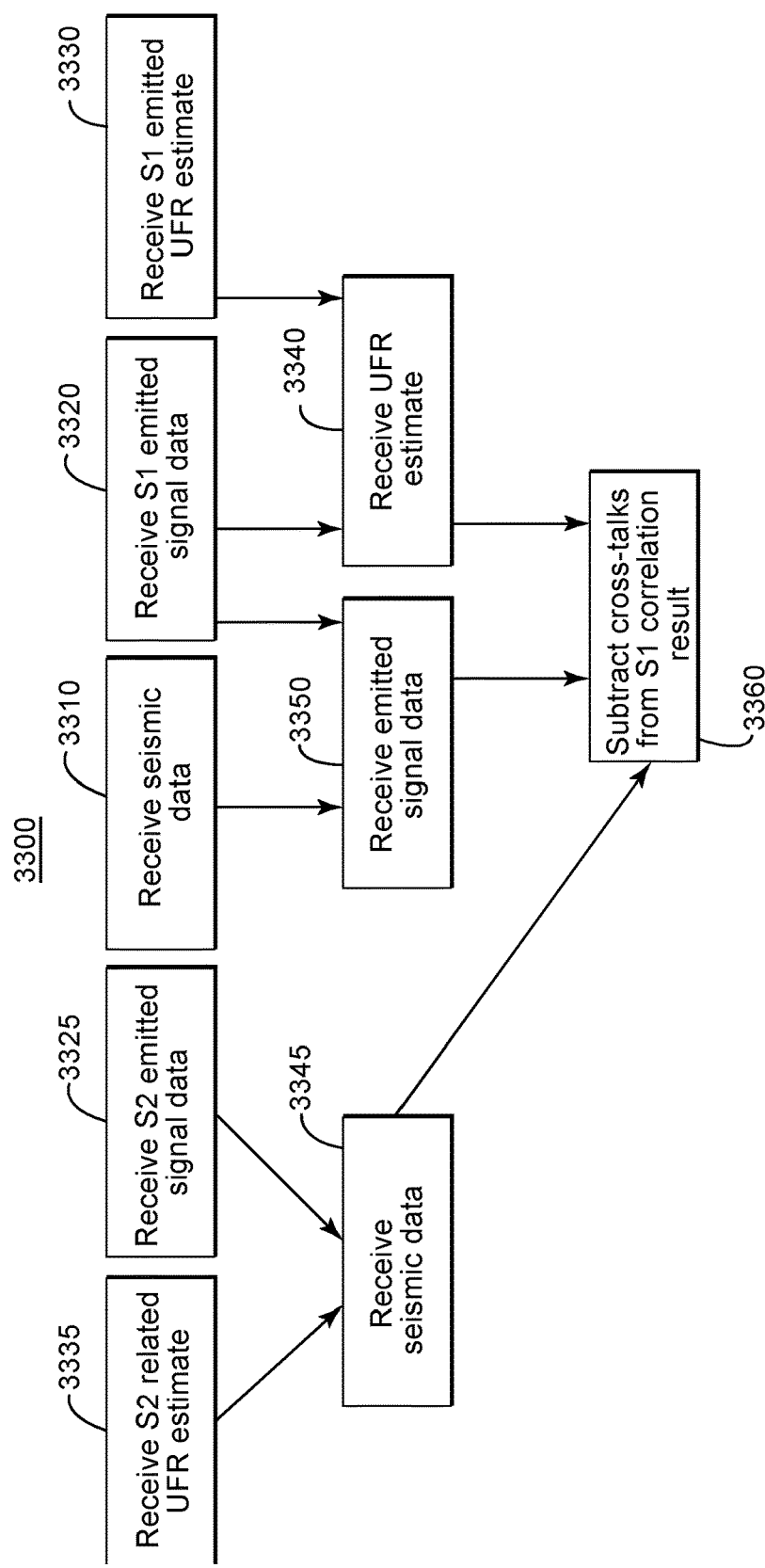
FIG. 33 is a block diagram of a method to estimate an underground formation's response according to another embodiment.

Method 3300 illustrated in FIG. 33 employs a strategy similar to method 3200 when two sources are used while acquiring the seismic data. Method 3300 includes receiving seismic data related to emission from two sources S1 and S2, at 3310. Emitted signal data related to S1 and to S2 are received at 3320 and 3325, respectively. Underground formation's responses (UFRs) estimates corresponding to S1 and to S2 (i.e., between S1 and a receiver, and between S2 and the receiver, respectively) are received at 3330 and 3335. At 3340 and 3345, contamination noise (cross-talk) due to S1 and due to S2, respectively, are calculated using the S1 and S2 emitted signal data, and the UFR estimates corresponding to S1 and to S2, respectively. At 3350, a noisy S1-related UFR estimate is obtained by applying correlations between the seismic data, and the S1 emitted signal data. Then, at 3360, the cross-talks obtained at 3340 and 3345 are subtracted from the noisy S1-related UFR estimate. The result of the subtraction may then be used to generate an image of the explored underground formation.

Steps 3340 and 3360 may be repeated (i.e., iterated), each iteration refining the S1 UFR estimate using the result of the subtraction in a previous iteration. Optionally, a coherency filter may be applied to the result of the subtraction to obtain an enhanced S1-related UFR estimate, which may be used in the next execution of 3340.

The possibilities for obtaining the initial response estimates discussed above relative to method 3200 are pertinent for S1 and S2-related UFR estimates used in the first iteration of method 3300.

Figure 34:
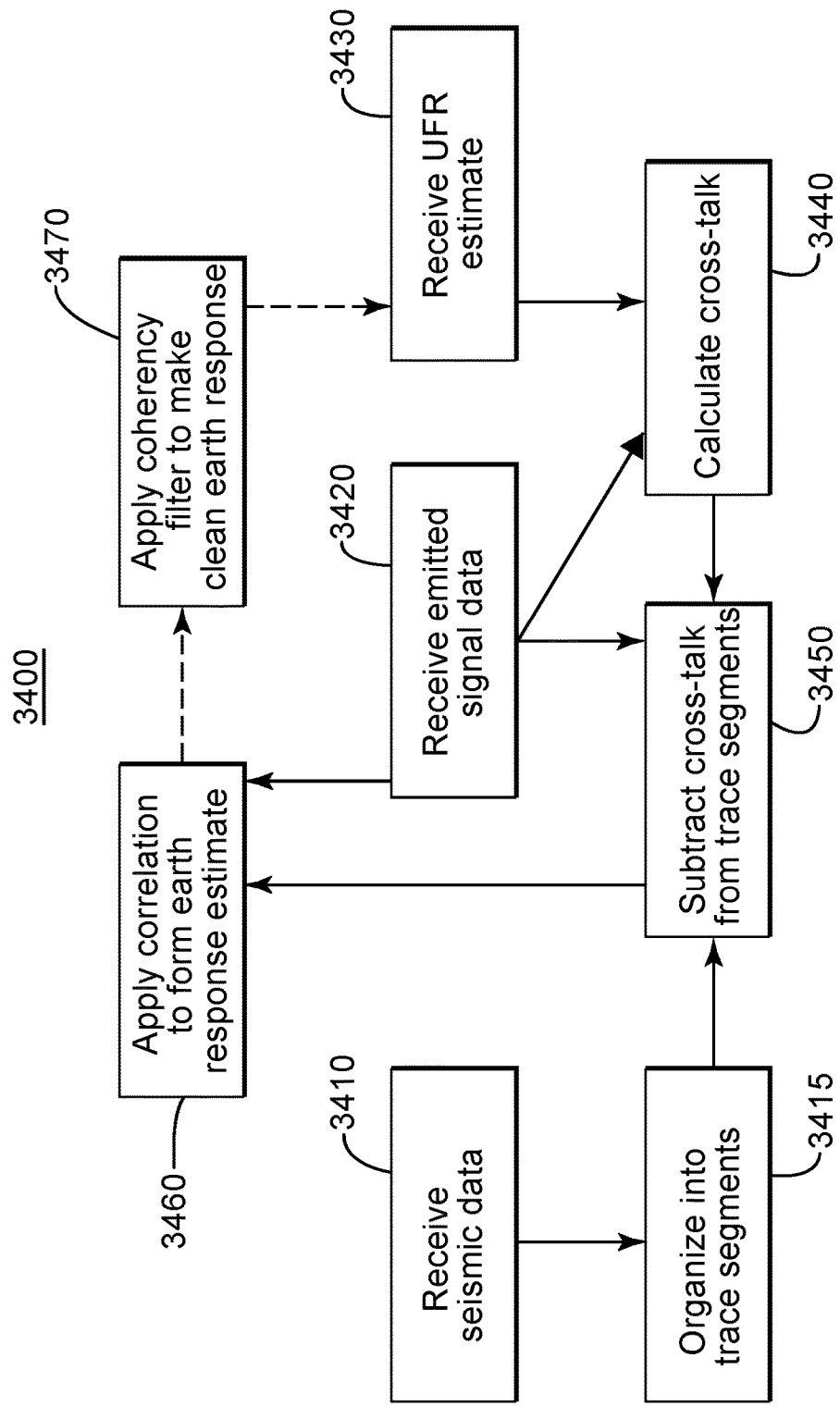
FIG. 34 is a block diagram of a method to estimate an underground formation's response according to yet another embodiment.

FIG. 34 is a block diagram of a method 3400 according to yet another embodiment. In method 3400, the cross-talk is subtracted from the seismic data before correlation. Method 3400 includes receiving seismic data related to emission from a moving non-impulsive source at 3410, emitted signal data at 3420, and an underground formation's response (UFR) estimate at 3430. At 3415, the seismic data is organized in trace segments. At 3440, contamination noise (cross-talk) is calculated using the emitted signal data and the UFR estimate.

At 3450, the cross-talk calculated at 3440 is subtracted from the trace segments obtained at 3415. Then, at 3460, an enhanced UFR estimate is obtained by applying correlations between the subtraction result and the emitted signal data.

Steps 3440-3460 may be repeated (iterated), each iteration refining the UFR estimate using the correlation result obtained at a previous iteration. At 3470, a coherency filter may be applied to obtain a cleaner UFR estimate. This optional feedback loop successively improves the UFR estimate, by iterative coherency filtering. Method 3400 may also be extended to work with more than one source.

Figure 35:
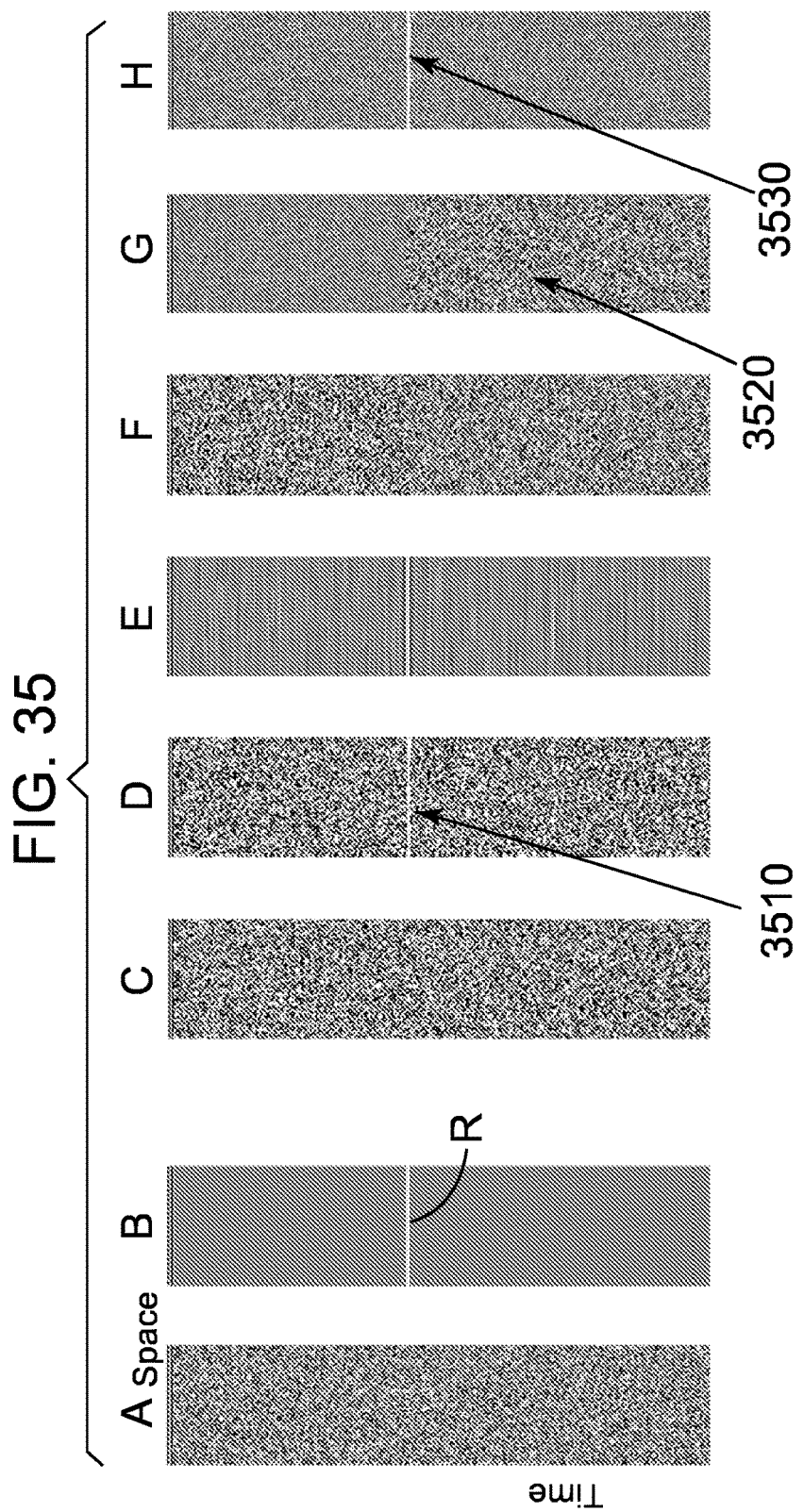
FIG. 35 is a graphical illustration of iterative cleaning methods.

To illustrate the manner in which the above described embodiments operate, consider graphs A-H in FIG. 35. In these graphs, the horizontal axes represent space, and the vertical axes represent time. Graph A represents a randomly varying pilot signal (i.e., emitted signal data) for a moving non-impulsive source. Graph B represents the underground formation's response, UFR, the formation including a single reflector interface R. Graph C illustrates seismic data recorded by a receiver and caused by the signal characterized by the pilot signal in graph A passing through the underground formation characterized by the response in graph B.

Graph D illustrates an UFR estimate obtained by correlation or a temporal inversion (e.g., a noisy UFR estimate). Arrow 3510 points to the weak signal visible in graph D. Graph E illustrates an initial UFR estimate that is convolved with graph A to calculate cross-talk, which is illustrated in graph F. In this example, graph E is the data in graph D after an FK dip filter to select flat energy. Graph G illustrates the result of subtracting the cross-talk (graph F) from the receiver data (graph C). Arrow 3520 points out the cross-talk estimate which is stronger than the upper portion of graph G, because the emitted signal could not have generated a response before the reflector R.

An enhanced UFR estimate obtained by applying a temporal inversion to the subtraction result is illustrated in graph H. Arrow 3530 emphasizes the increased signal-to-noise ratio compared to graph D (i.e., the reflector is more clearly visible in graph H).

Cross-talk may be calculated using the following method:
receiving an UFR estimate relating to a spatial sampling,
receiving emitted signal information relating to a spatial sampling,
convolving UFR estimate with emitted signals,
combining the convolution results at successive spatial positions based on the emission time, and
calculating the difference between the combination and the convolution results.

According to one embodiment, a non-blended detected signal and a blended detected signal may be calculated based on the UFR estimate and the emitted signal information. The cross-talk is the difference between the calculated blended and the unblended signals. Calculating blended and unblended signals (which the receiver detects and records as seismic data) may be performed by combining an UFR estimate and emitted signals via a linear operator. If the cross-talk in an emission window is sought, the emission window may be narrowed to zero based on the emitted signal information, and the same linear operator may be applied to this narrowed UFR estimate. The UFR estimate may be in the time-space domain or in a model domain (such as in WIPO Patent Application WO/2015/011160).

Returning again to calculating cross-talk, according to another embodiment, the following method may be used:
transforming an UFR estimate in τ-p domain;
removing weak energy in the τ-p domain (e.g., based on the envelope of the transformed UFR estimate);
reverse transform the result of the removing from the τ-p domain; and
calculate cross-talk contamination using result of the reversed transformation.

Alternatively, according to yet another embodiment the cross-talk may be calculated as follows:
transforming an UFR estimate in τ-p domain;
encoding source directivity using the UFR estimate and the transformed UFR estimate; and
reverse transform the result of the removing from the τ-p domain.

Other domains than the τ-p domain may be used (e.g. FK, curvelet, ridgelet, fx, parabolic Radon, etc.).

Various source correction techniques may be employed and combined: an inversion approach as described in WO 2015/011160, the above-described deconvolution approach, the above-described temporal inversion approach, the above-described spatial or spatio-temporal inversion approach, and/or the above-described iterative cleaning approach. An approach using annihilation filters is described in U.S. patent application Ser. No. 14/804,820. Signature convolution/deconvolution techniques may be combined with source deghosting by including the source ghost in the signal emission. The resulting data may be time-variant filtered to attenuate high-frequency residual contamination noise in the deep section where only lower frequency reflection energy is expected.

The inversion methods may be adapted to simultaneously derive energy relating to more than one source. This involves defining the model vector equation (4), a top portion thereof being related to a first source, and a bottom portion to a second source. The matrix L would then apply a convolution of each vector portion followed by a summation to result in the recorded data.

$$d = (L_1 \ L_2) \binom{m_1}{m_2} \quad (4)$$

where subscripts 1 and 2 relate to sources 1 and 2. More than 2 sources may be used.

In another embodiment, calculating cross-talk is performed by:
  transforming the estimate of the underground formation's response into the τ-p domain;
  encoding directivity using the estimate of the underground formation's response and the result of the transforming above; and
  performing a reverse τ-p transform to the above result.

According to yet another embodiment for two or more sources operated simultaneously, a method for attenuating cross-talk noise includes:
  receiving an estimate of the underground formation's response between source 1 and the receiver;
  receiving emission data for non-impulsive emission source 1;
  receiving an estimate of the underground formation's response between source 2 and the receiver;
  receiving emission data for non-impulsive emission source 2;
  calculating cross-talk contamination noise using the received estimates and emission data;
  receiving seismic data (i.e., receiver-recorded signal);
  subtracting the calculated cross-talk noise from the seismic data to obtained de-noised seismic data;
  using the de-noised seismic data and emission data for source 1 to calculate data representative to the underground formation's response for an impulsive source at source 1's location and the receiver.

Plural methods described in this section start with initial UFR estimates (that may be obtained from an initial correlation/deconvolution) used in an iterative cleaning processing. The iterative cleaning approach is more flexible than the τ-p inversion techniques described in WO2015/011160.

Figure 36:
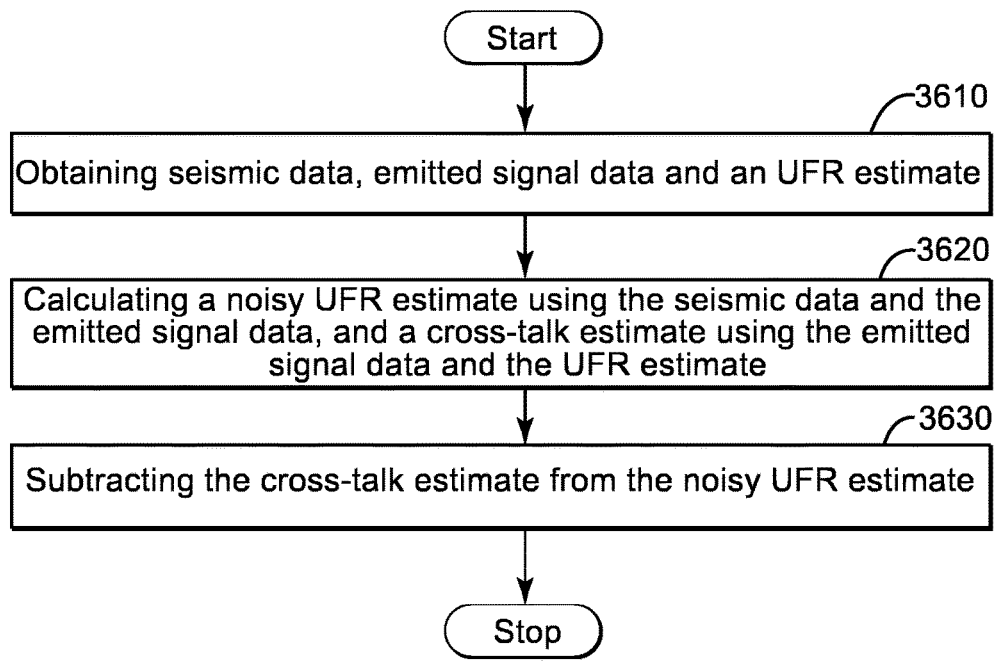
FIG. 36 is a flowchart of a method according to an embodiment.

FIG. 36 is a flowchart of a method 3600 for processing seismic data acquired using a moving non-impulsive source. Method 3600 includes obtaining seismic data, emitted signal data and an UFR estimate, at 3610. Method 3600 further includes calculating a noisy UFR estimate using the seismic data and the emitted signal data, and a cross-talk estimate using the emitted signal data and the UFR estimate, at 3620. Method 3600 then includes subtracting the cross-talk estimate from the noisy UFR estimate, at 3630. The result of the subtracting is further used to generate an image of the explored underground formation.

Figure 37:
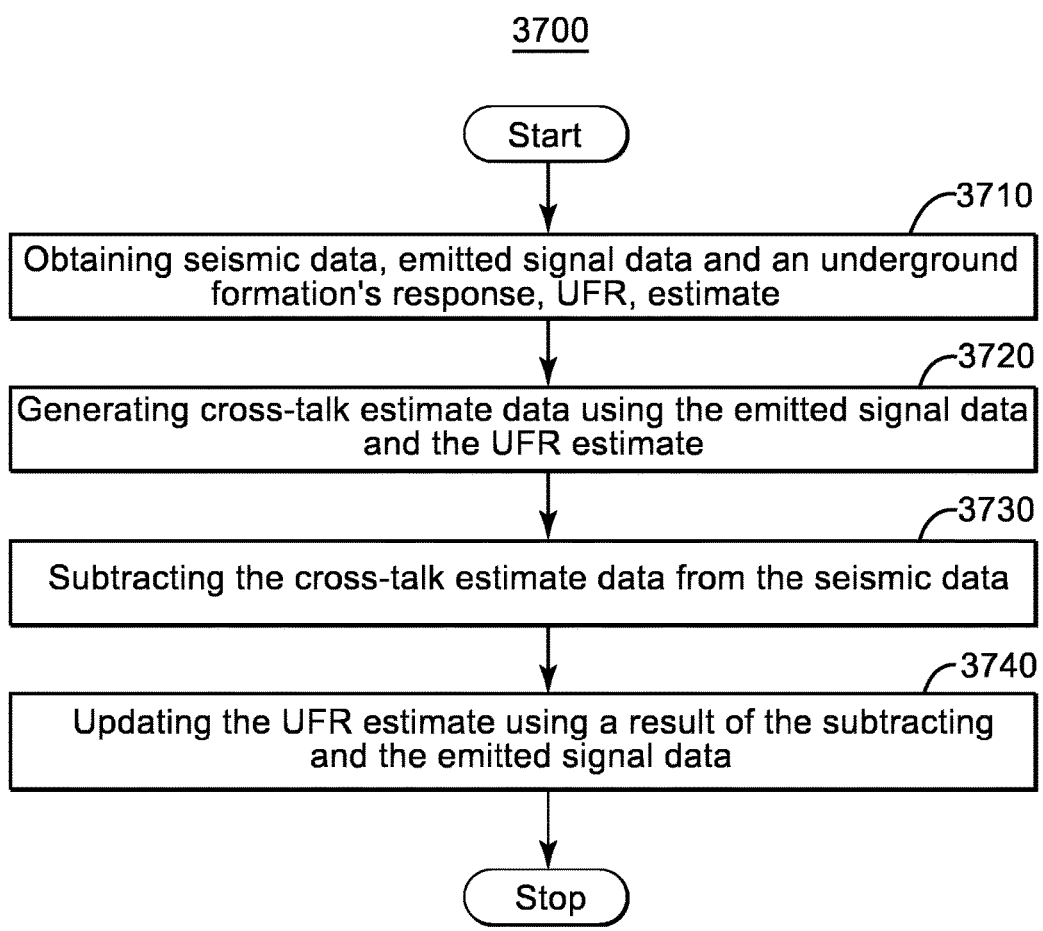
FIG. 37 is a flowchart of a method according to another embodiment.

FIG. 37 is a flowchart of a method according to another embodiment. Method 3700 includes obtaining the seismic data, emitted signal data and an UFR estimate, at 3710, generating cross-talk estimate data using the emitted signal data and the UFR estimate, at 3720, subtracting the cross-talk estimate data from the seismic data, at 3730, and updating the UFR estimate using a result of the subtracting and the emitted signal data, at 3740. The updated UFR estimate is usable in further processing of the seismic data to obtain an image of underground formation's structure.

In one embodiment, steps 3720-3740 are repeated, using the latest updated UFR estimate at each new iteration. Repeating steps 3720-3740 may be stopped when a predetermined criterion (e.g., after a number of iterations, when a signal-to-noise ratio reaches a predetermined threshold, etc.) is met. A coherency filter may be applied when updating the UFR estimate.

Figure 38:
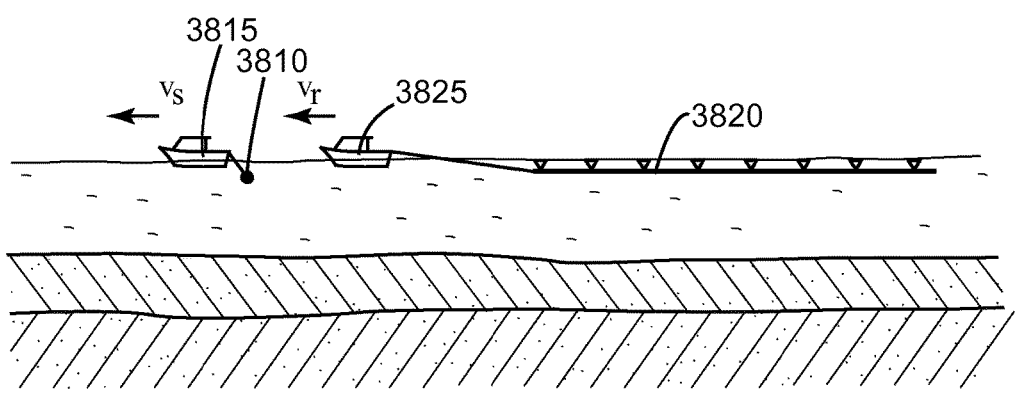
FIG. 38 illustrates a multi-vessel marine survey system.

Correcting for Doppler Effect in Seismic Data Acquired Using Moving Non-Impulsive Sources Recently, plural vessels are used during marine surveys to enhance azimuth coverage and decrease survey time. As illustrated in FIG. 38, a source 3810 is towed by a vessel 3815 with a moving velocity $v_s$, different from a velocity $v_r$ of a streamer 3920 carrying receivers, which is towed by another vessel 3825. Source 3810 (which may consist of plural individual sources) may be a non-impulsive source emitting any type of the previously discussed signals (e.g., sweeps of various types). The receivers may record continuously, the receiver-recorded data being a blending of reflections due to different excitations. The source signatures associated with incident signals penetrating the explored underground formation as well as with the recorded receiver data are affected by motion effects such as (but not limited to) Doppler effects.

Therefore, the receiver-recorded data has to be de-blended and motion effects corrected or compensated to obtain traces associated with virtual fixed receiver locations corresponding to known source receiver offsets in the quest for the underground formation's response. This processing can be performed by inverting a high-dimensional plane-wave domain model (f-p model, τ-p model, f-k model, etc.) that corresponds to the receiver-recorded data.

In order to build a linear relationship (i.e., a matrix mathematically) between the high-dimensional plane-wave domain model and the receiver-recorded data, the source emission is split into time pieces. These time pieces may have the same duration or different durations, but they should be neither too short because then the matrix is too big, leading to unreasonable computation time and bad orthogonality between pieces, nor too long because then geological features of the underground structure may be obscured. A starting time and a starting location are known for each piece, this information being incorporated in the linear relationship. The Doppler effects (i.e., shifts in the receiver-detected signal frequency relative to the emitted signal frequency) due to the moving source, and the wavefront direction are also incorporated in the linear relationship. The inversion may be carried out separately in distinct time windows along the traces.

For a two-dimensional (2D) inversion, the relationship between the high dimensional plane-wave domain model, $M(p_s, p_r, \omega)$, and receiver-recorded data $$D(x_r, t) \text{ is} \tag{5}$$

$$D(x_r, t) = \iint (1 - v_{RCV} \cdot p_r) e^{-i\omega(1 - v_{RCV} \cdot p_r)\frac{p_r x_r}{(1 - v_{RCV} \cdot p_r)}} e^{i\omega(1 - v_{RCV} \cdot p_r)t}$$

$$\sum_g \int \frac{1}{1 + v_{SRC} \cdot p_s} S_g\left(\frac{p_s}{1 + v_{SRC} \cdot p_s}, \omega(1 + v_{SRC} \cdot p_s)\right)$$

$$M(p_s, p_r, \omega) e^{-i\omega(p_s(x_g - x_r) + \tau_g)} dp_s d\omega$$

where t is the time index of the recordings, $x_r$ is the starting location of the receiver at the beginning of the time window, $p_s$ and $p_r$ are the slopes of the plane wave on the source side and the receiver side, respectively, w is the angular frequency, $x_g$ is the initial location of the source at the beginning time of the source emission piece g, and $\tau_g$ is the time shift of the beginning of the source emission piece g related to the beginning of the time window under consideration. Further $S_g(p, \omega)$ is the directional spectrum of the source emission piece g, and $$\frac{1}{1+v_s p_s} S_g\left(\frac{p_s}{1+v_s p_s}, \frac{\omega'}{1-v_r p_r}(1+v_s p_s)\right)$$

is the source-motion compensated version of that spectrum, where $v_s$ is the source velocity and $v_r$ is the receiver velocity.

When making the variable substitution $\omega'=\omega(1-v_r \cdot p_r)$ to formula (5) becomes $$D(x_r, t) = \qquad (6)$$

$$\int\int e^{-i\omega'\frac{p_r x_r}{(1-v_{RCV}\cdot p_r)}} e^{i\omega' t} \sum_g \int \frac{1}{1+v_{SRC}\cdot p_s} S_g\left(\frac{p_s}{1+v_{SRC}\cdot p_s},\right.$$

$$\left.\frac{\omega'}{1-v_{RCV}\cdot p_r}(1+v_{SRC}\cdot p_s)\right)$$

$$M'(p_s, p_r, \omega')e^{-i\frac{\omega'}{1-v_{RCV}\cdot p_r}(p_s(x_g-x_r)+\tau_g)} dp_s d\omega'$$

where $M'(p_s, p_r, \omega)=M(p_s, p_r, \omega'/(1-v_r\cdot p_r))$. After discretization, equation (6) can be expressed as a set of linear equations:

$$D=CM' \qquad (7)$$

where D is a vector representing the observed data, M' is a vector representing an unknown model, and C is the matrix form of the integral and summation kernel in equation (6). M' is obtained by solving equation (7), and then it is converted to M. Model M an then be transformed into impulse response of the underground formation for stationary receiver and source location, $d(x_r, x_g, t)$ using the following formula:

$$d(x_r,x_g,t)=\iiint M(p_s,p_r,\omega)e^{-i\omega p_s(x_g-x_r)}e^{i\omega p_r x_r}e^{i\omega t}dp_r dp_s d\omega \qquad (8)$$

where $x_r$, and $x_g$ are stationary receiver and source locations, respectively. $d(x_r, x_g, t)$ can then be further processed using conventional techniques.

Equations (5)-(8) are set forth for a 2D approach, but can be extended for a three-dimensional (3D) approach by introducing more coordinates $y_r$ and $y_g$ in data space, and $p_{yr}$ and $p_{yg}$ in model space, and considering respective Doppler effects.

To summarize this section, receiver data acquired when using a non-impulsive moving source is deblended while simultaneously performing source motion and receiver motion compensation by using one inversion of a high dimensional plane-wave domain model.

Figure 39:
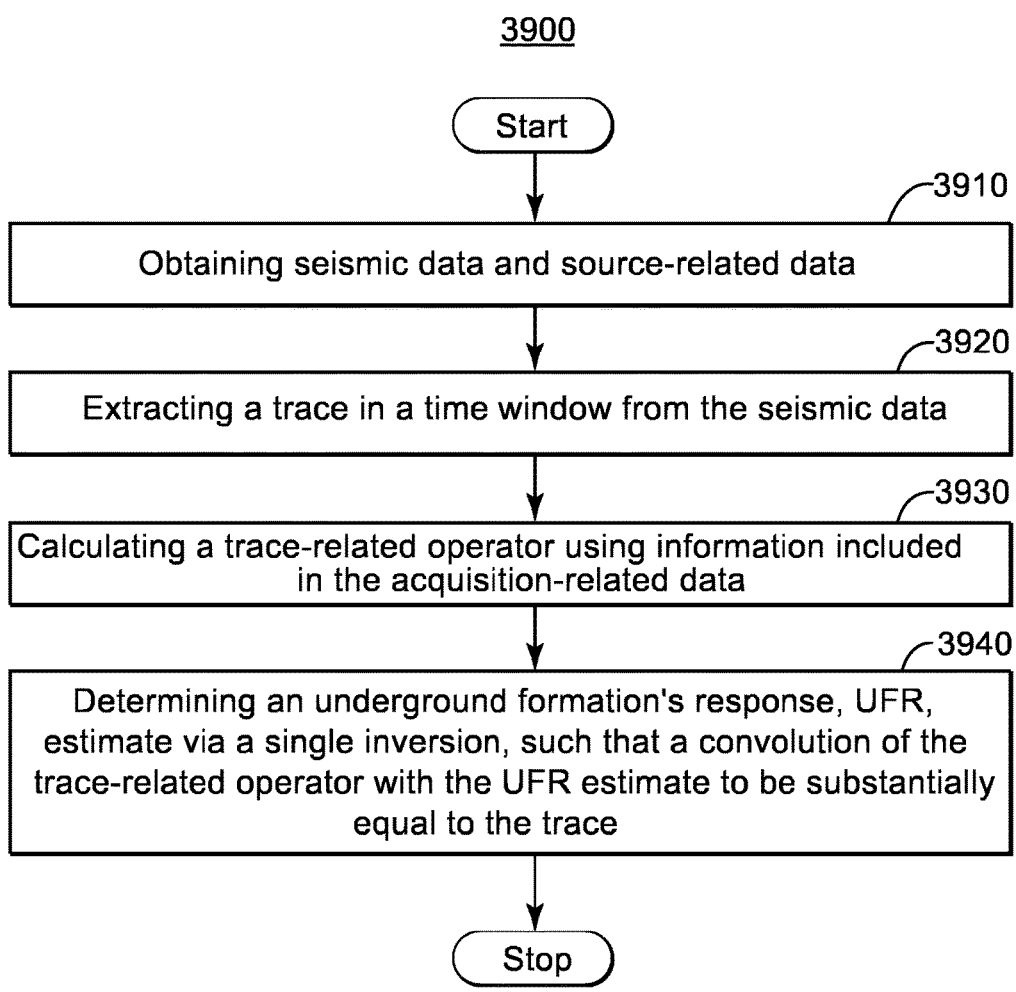
FIG. 39 is a flowchart of a method according to another embodiment.

FIG. 39 is a flowchart of a method 3900 for processing seismic data according to an embodiment. Method 3900 includes obtaining seismic data recorded by a moving receiver following signals emitted by a moving source, and acquisition-related data, at 3910, and extracting a trace in a time window from the seismic data at 3920. Further, method 3900 includes calculating a trace-related operator using information included in the acquisition-related data, at 3930. The information relates to a starting location of the receiver at a beginning of the time window, a source velocity, a receiver velocity, slopes of plane waves at a source side and at a receiver side, initial locations of the source when each of emission pieces in the time window start, respectively, time shifts between the beginning of the time window and when the emission pieces started, respectively, and directional spectra of each of the emission pieces.

Method 3900 then includes determining an underground formation's response, UFR, estimate via a single inversion, such that a convolution of the trace-related operator with the UFR estimate to be substantially equal to the trace, at 3940. The inversion performs source motion correction, receiver motion correction and deblending simultaneously. The UFR estimate is further processed to generate an image of underground formation's structure.

Figure 40:
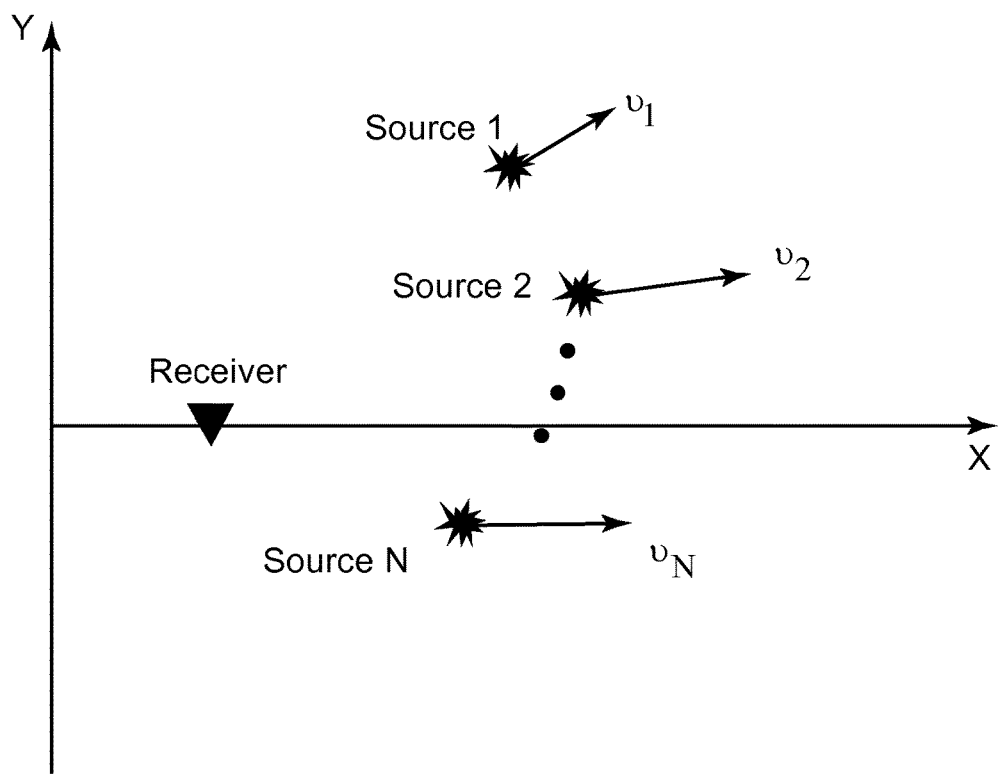
FIG. 40 illustrates data acquisition for a stationary receiver and plural non-impulsive moving sources.

3D Deblendinq and Designature for Data Acquired Sparsely Distributed Non-Impulsive Sources FIG. 40 illustrates data acquisition for a stationary receiver (or a moving receiver for which receiver movement compensation methods have been applied) when using plural non-impulsive moving sources. The following embodiments organize and convert the receiver-recorded data into 3D impulsive common receiver gathers to which conventional seismic data processing methods can be further applied.

In the data acquisition system illustrated in FIG. 40, plural non-impulsive sources (Source 1, Source 2, ..., Source N, where N>2) are so sparsely distributed that plane-wave decomposition cannot be applied accurately based on the source coordinates. Additionally, the sources have different velocities and even different directions. Therefore, converting the blended continuously receiver-recoded data to a common 3D receiver gather is challenging.

If it is assumed that sources' signatures are not angle-dependent (i.e., spherically symmetric emission), then the 3D common receiver gathers may be obtained along the trajectories of these sources by inverting N 2D τ-p models. Note that if the sources' signatures are angle-dependent and/or Doppler effects have to be considered, then an accurate 3D τ-p model would be needed, and the sparse distribution of the sources make this task practically impossible.

One τ-p model is inverted for each of the sources. 3D impulsive common receiver gathers may be constructed along the sources' trajectories, using the N 2D τ-p models.

According to one embodiment, the source emissions are divided into short (e.g., 0.5 s) pieces, and each piece is treated as a shot. The source motion during these short pieces may be neglected and thus no Doppler-effect correction or compensation is needed. Under the angle independent source signature assumption, the angle-independent spectra is calculated for the small pieces (short emission sections). The stationary receiver trace may be expressed by the formula:

$$d(t)=\int_\omega e^{i\omega t}\Sigma_{s=1}^N \Sigma_g S_{s,g}(\omega)\int_p M_s(p,\omega)e^{-j\omega(p\cdot(x_{s,g}-x_r)+\tau_{s,g})}$$
$$dpd\omega \qquad (9)$$

where s is the index of the sources, g is the index of the divided shots of the sources, $S_{s,g}(\omega)$ is the spectrum of source s signature during shot g, $M_s(p, \omega)$ is the F-P model (i.e., the Fourier transform of the τ-p model in time domain) of the common receiver gather on the source s trajectory, and $\tau_{s,g}$ is the starting time of the source s, shot g. Since $S_{s,g}(\omega)$ is angle-independent and the Doppler effects are negligible, in the model M parameter p does not have a definite physical meaning. Therefore the model is a representation of the common receiver gather on the trajectory of source s instead of a plane-wave decomposition.

In fact, the model is not limited to τ-p; any transform that has sparse representation for the common receiver gather may be used. The matrix form of formula (9) is:

$$d = (\mathbb{T}_1 \ \ldots \ \mathbb{T}_N)\begin{pmatrix} \mathbb{S}_1 & \ldots & 0 \\ \vdots & \ddots & \vdots \\ 0 & \ldots & \mathbb{S}_N \end{pmatrix}\begin{pmatrix} \mathbb{C} & \ldots & 0 \\ \vdots & \ddots & \vdots \\ 0 & \ldots & \mathbb{C} \end{pmatrix}\begin{pmatrix} m_1 \\ \vdots \\ m_N \end{pmatrix} \qquad (10)$$

where $m_i$ are model vectors, C is the sparse transform matrix, Si are matrices for signature convolving, and $T_i$ are matrices for corresponding time translation of different shots.

Thus, instead of inverting an accurate 3D τ-p model for obtaining 3D common receiver gathers, a series of 2D τ-p models (or models other than τ-p) for each source are inverted the same time. A 3D impulsive common receiver gather with shot points on the source trajectories can then be constructed from these models. This approach reduces the computational effort for the model inversion and can be applied when the sources are sparsely distributed.

Figure 41:
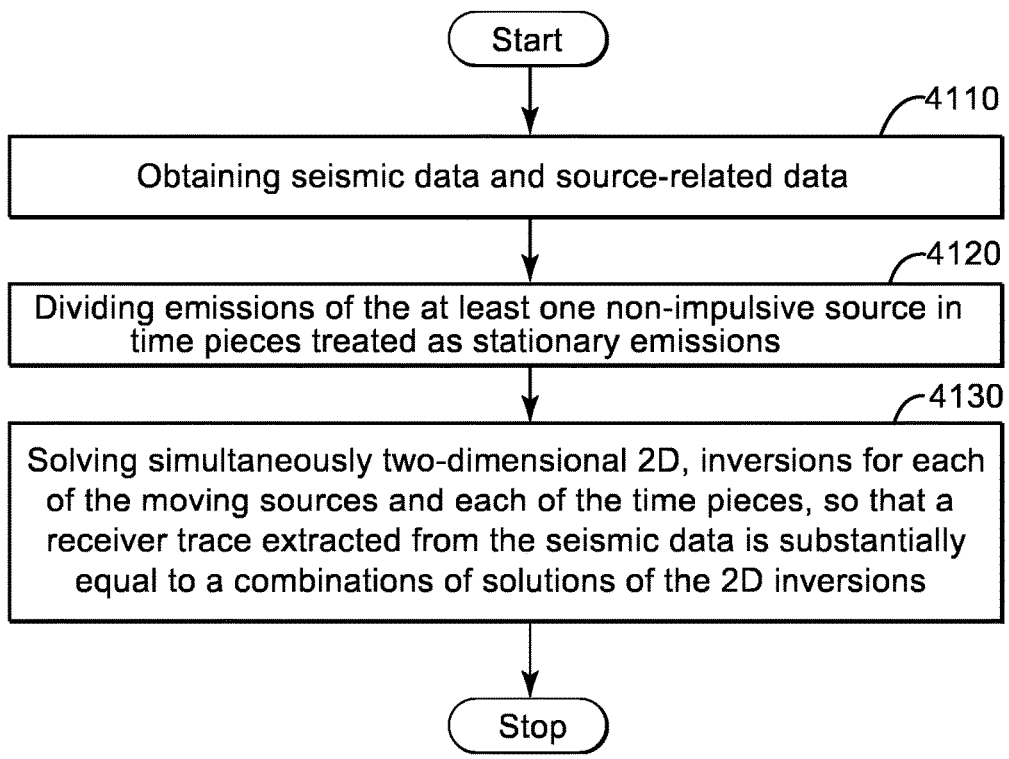
FIG. 41 is a flowchart of a method according to an embodiment.

FIG. 41 is a flowchart of a method 41 for deblending data acquired using sparsely distributed independently moving sources including at least one non-impulsive source, according to an embodiment. Method 41 includes obtaining seismic data and acquisition-related data, at 4110, and dividing emissions of the at least one non-impulsive source in time pieces treated as stationary emissions, at 4120. Method 4100 further includes solving simultaneously two-dimensional, 2D, inversions for each of the moving sources and each of the time pieces, so that a receiver trace extracted from the seismic data is substantially equal to a combination of solutions of the 2D inversions, at 4130.

The seismic data processing methods described in this document achieve noise reduction, de-blending and motion correction for seismic data acquired to explore underground formations. The seismic data is acquired during seismic surveys by receivers, following signals (i.e., excitations) injected into the explored underground formations. Due to the data volume and complexity of the algorithms used at different steps, the seismic data processing is performed using computers. The seismic data processing outputs structural information related to the underground formations, information which is often visualized as images.

Figure 42:
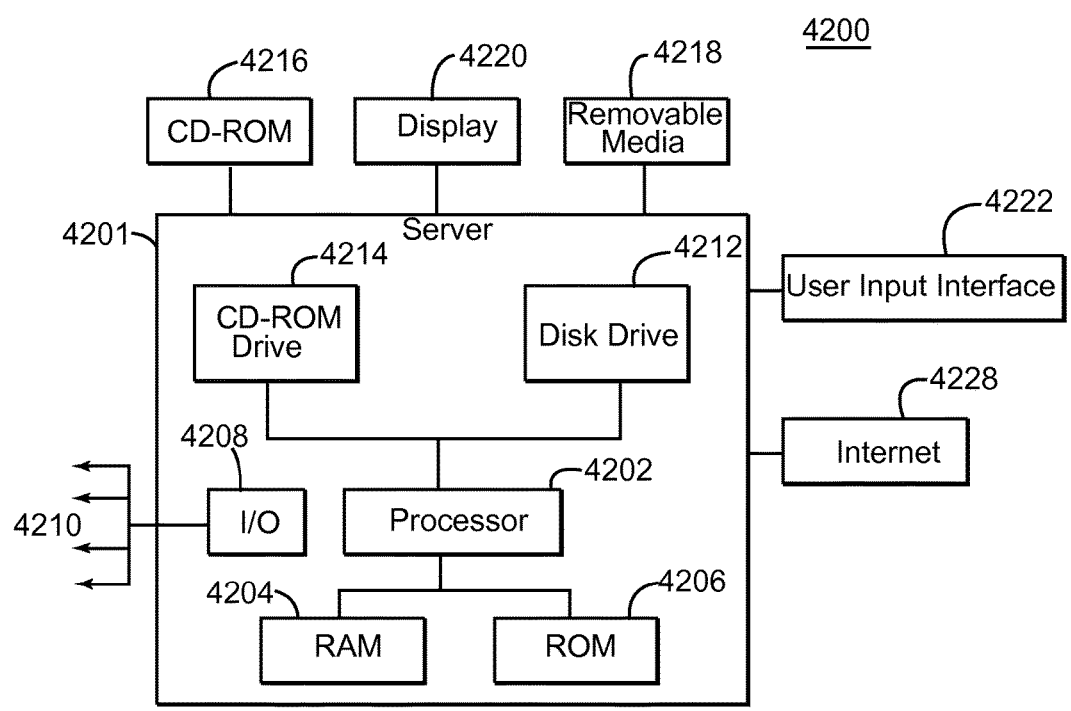
FIG. 42 is a computer system according to an embodiment.

FIG. 42 illustrates a computing system 4200 suitable for performing seismic data processing methods described in this document. System 4200 may include a server 4201 that has at least one processor 4202 coupled to a random access memory (RAM) 4204 and to a read-only memory (ROM) 4206. ROM 4206 may also be other types of storage media to store programs, such as programmable ROM (PROM), erasable PROM (EPROM), or Flash. Processor 4202 may communicate with other internal and external components through input/output (I/O) circuitry 4208 and bussing 4210, to provide control signals and the like. The processor 4202 may carry out a variety of functions as are known in the art, as dictated by software or firmware instructions.

The server 4201 may also include one or more data storage devices, including a disk drive 4212 (e.g., a hard drive), CD-ROM drives 4214, and other hardware capable of reading or storing information such as DVD, etc. In one embodiment, software for carrying out the above-discussed methods may be stored as executable codes and distributed on a CD- or DVD-ROM 4216, removable memory device 4218 or other tangible, non-transitory computer-readable storage medium capable of portably storing information. These storage media may be inserted into, and read by, devices such as CD-ROM drive 4214 or disk drive 4212. The server 4201 may be coupled to a display 4220, which may be any type of known display or presentation screen, such as LCD, LED displays, plasma displays, cathode ray tubes (CRT), etc. A user input interface 4222 can be provided, including one or more user interface mechanisms such as a mouse, keyboard, microphone, touchpad, touch screen, voice-recognition system, etc.

The server 4201 may also be coupled to other computing devices or systems, such as landline or wireless terminals, via a network. The server may be part of a larger network configuration as in a global area network such as the Internet 4228, which permits connection to various landline or mobile client devices. The network may include a satellite telephone link or shortwave radio link. The computing system 4200 may be placed on a vessel that performs a marine seismic survey.

The disclosed exemplary embodiments provide methods, apparatuses and computer-readable media storing executable codes for processing seismic data acquired using non-impulsive moving source(s). It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for processing seismic data related to a moving non-impulsive source, the method comprising:
    obtaining seismic data, emitted signal data and an underground formation's response, UFR, estimate;
    calculating a noisy UFR estimate using the seismic data and the emitted signal data, and a cross-talk estimate using the emitted signal data and the UFR estimate;
    subtracting the cross-talk estimate from the noisy UFR estimate to obtain an updated UFR estimate; and
    generating an image of underground formation's structure based on the updated UFR estimate.

2. The method of claim 1, wherein the noisy UFR estimate is obtained by cross-correlating the seismic data with the emitted signal data.

3. The method of claim 1, wherein the noisy UFR estimate is obtained using an inversion method.

4. The method of claim 3, wherein the inversion method is a spatial or a spatio-temporal inversion.

5. The method of claim 1, the UFR estimate is obtained by applying a coherency filter to the noisy UFR estimate.

6. The method of claim 1, further comprising:
    repeating the calculating of the cross-talk estimate and the subtracting of the cross-talk estimate from the noisy UFR estimate, wherein the UFR estimate used when repeating the calculating is the updated UFR estimate.

7. The method of claim 6, further comprising:
    improving the updated UFR estimate by applying a coherency filter.

8. The method of claim 6, wherein the calculating and the subtracting are repeated until a predetermined criterion is met.

9. The method of claim 1, further comprising:
calculating a second cross-talk noise using second emitted signal data and a second UFR estimate; and
subtracting the second cross-talk noise from the updated UFR estimate.

10. A seismic data processing apparatus for processing seismic data related to a moving non-impulsive source to obtain an image of an explored underground formation, comprising:
an interface configured to obtain the seismic data, emitted signal data and an underground formation's response, UFR, estimate; and
a data processing unit configured to calculate a cross-talk estimate using the emitted signal data and the UFR estimate, to obtain a noisy UFR estimate using the seismic data and the emitted signal data, to subtract the cross-talk estimate from the noisy UFR estimate to obtain an updated UFR estimate, and to generate an image of underground formation's structure based on the updated UFR estimate.

11. The seismic data processing apparatus of claim 10, wherein data processing unit obtains the noisy subsurface response by cross-correlating the seismic data with the emitted signal data, or by using an inversion method.

12. The seismic data processing apparatus of claim 10, wherein the data processing unit is configured to repeat calculating the cross-talk estimate using the updated UFR estimate, and to then subtract again the cross-talk estimate from the noisy UFR estimate, until a predetermined criterion is met.

13. The seismic data processing apparatus of claim 12, wherein the data processing unit applies a coherency filter to improve the updated UFR estimate.

14. The seismic data processing apparatus of claim 10, wherein the data processing unit is further configured to subtract the cross-talk estimate data from the seismic data, and to update the UFR estimate using a result of the subtracting and the emitted signal data.

15. The seismic data processing apparatus of claim 14, wherein the data processing unit performs generating the cross-talk estimate data, subtracting the cross-talk estimate data from the seismic data and updating the UFR estimate using a result of the subtracting repeatedly, until a predetermined criterion is met.

16. The seismic data processing apparatus of claim 10, further comprising:
a non-transitory computer readable recording medium storing executable codes which, when executed by the data processing unit, make the data processing unit to process the seismic data related to the moving non-impulsive source to obtain an image of an explored underground formation.

* * * * *